United States Patent
Wheeler et al.

(10) Patent No.: US 10,498,966 B2
(45) Date of Patent: Dec. 3, 2019

(54) ROLLING SHUTTER CORRECTION FOR IMAGES CAPTURED BY A CAMERA MOUNTED ON A MOVING VEHICLE

(71) Applicant: DeepMap Inc., Palo Alto, CA (US)

(72) Inventors: Mark Damon Wheeler, Saratoga, CA (US); Lin Yang, San Carlos, CA (US)

(73) Assignee: DeepMap Inc., Palo Alto, CA (US)

( * ) Notice: Subject to any disclaimer, the term of this patent is extended or adjusted under 35 U.S.C. 154(b) by 0 days.

(21) Appl. No.: 16/162,224

(22) Filed: Oct. 16, 2018

(65) Prior Publication Data

US 2019/0222736 A1    Jul. 18, 2019

Related U.S. Application Data

(60) Provisional application No. 62/574,744, filed on Oct. 19, 2017.

(51) Int. Cl.
*G06K 9/46* (2006.01)
*H04N 5/232* (2006.01)
*H04N 13/106* (2018.01)

(52) U.S. Cl.
CPC ......... *H04N 5/2329* (2013.01); *H04N 13/106* (2018.05)

(58) Field of Classification Search
CPC ..................... H04N 5/2329; H04N 5/3532
See application file for complete search history.

(56) References Cited

U.S. PATENT DOCUMENTS

| | | |
|---|---|---|
| 2007/0154202 A1 | 7/2007 | Lee et al. |
| 2008/0195261 A1 | 8/2008 | Breed |
| 2009/0201361 A1 * | 8/2009 | Lyon .................. H04N 5/23203 348/36 |
| 2011/0134254 A1 | 6/2011 | Hulsken et al. |
| 2015/0054955 A1 | 2/2015 | Lim |
| 2015/0073711 A1 | 3/2015 | Brewington et al. |
| 2015/0181198 A1 | 6/2015 | Baele et al. |
| 2015/0234045 A1 * | 8/2015 | Rosenblum ........... G01S 13/931 342/71 |
| 2016/0253566 A1 * | 9/2016 | Stein .................. G06K 9/00791 348/148 |

OTHER PUBLICATIONS

PCT International Search Report and Written Opinion, PCT Application No. PCT/US2018/056102, dated Jan. 28, 2019, 12 pages.

* cited by examiner

*Primary Examiner* — Zhubing Ren
(74) *Attorney, Agent, or Firm* — Fenwick & West LLP

(57) ABSTRACT

A system performs rolling shutter correction to transform data captured by sensors of a vehicle, for example, cameras or lidar mounted on a vehicle, for example, an autonomous vehicle. The images captured by a rolling shutter camera mounted on a moving vehicle show rolling shutter distortion. The rolling shutter correction transforms the data representing points of scenes to perform rolling shutter compensation, i.e., compensation for the rolling shutter distortion. The rolling shutter compensation ensures that data representing as three dimensional points, for example, data captured by lidar is consistent with data represented in images captured by a rolling shutter camera. The system performs rolling shutter compensation by estimating a distance travelled by the vehicle between the time that the camera captured a point and the time that the image scan was completed and translating the 3D points by the estimated distance.

20 Claims, 23 Drawing Sheets

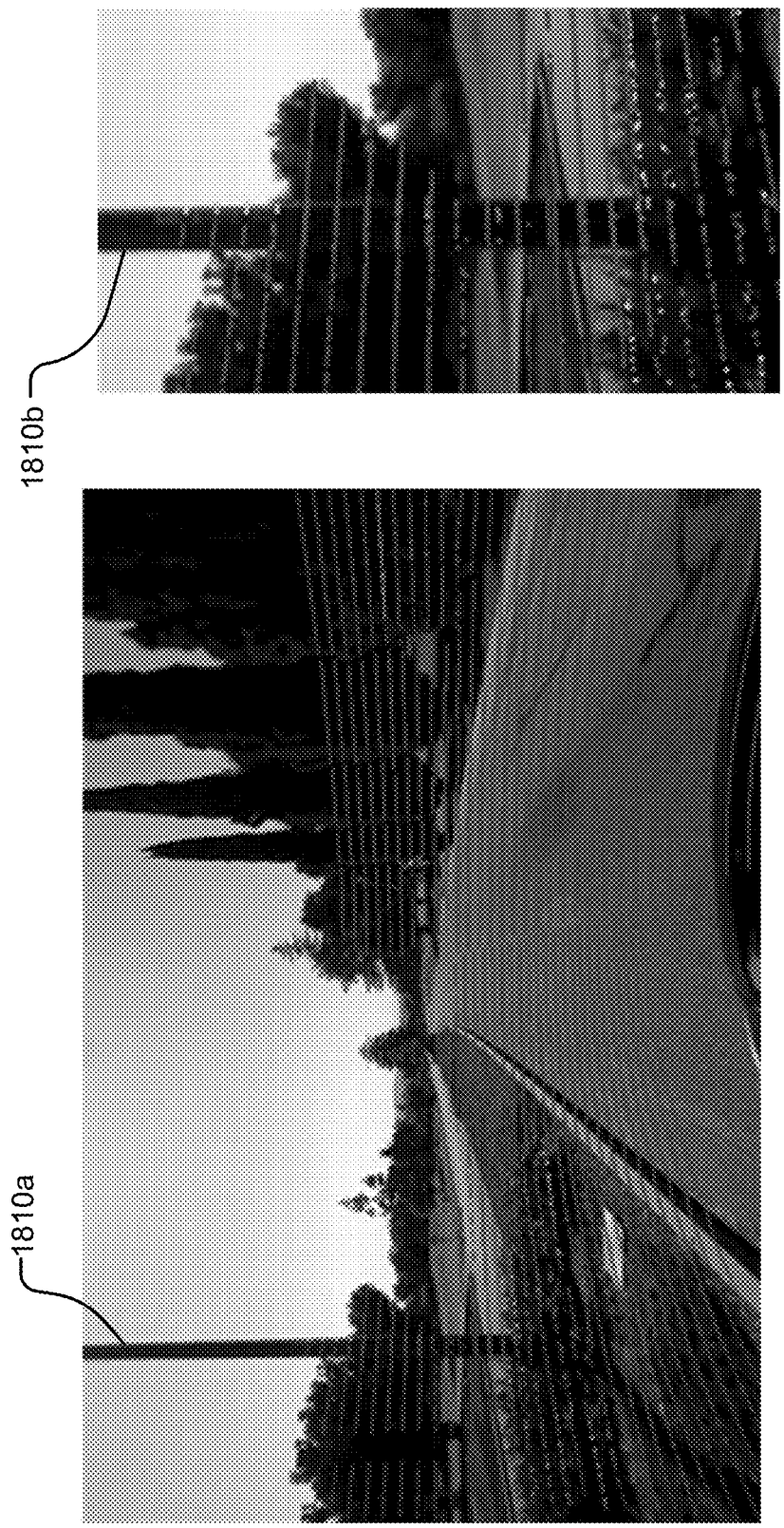

ROLLING SHUTTER CORRECTION FOR IMAGES CAPTURED BY A CAMERA MOUNTED ON A MOVING VEHICLE

CROSS REFERENCE TO RELATED APPLICATIONS

This application claims the benefit and priority of U.S. Provisional Application No. 62/574,744 filed Oct. 19, 2017, which is incorporated by reference herein in its entirety.

BACKGROUND

This disclosure relates generally to processing of images captured by sensors of a vehicle, and more particularly to performing rolling shutter correction of images captured by cameras of a moving vehicle, for example, an autonomous vehicle.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. Generation or use of high definition maps for self-driving requires use of various sensors, for example, lidar and camera sensors. Several vehicles use rolling shutter cameras that capture a still picture or each frame of a video by scanning across the scene rapidly, either vertically or horizontally. A till picture or a frame of a video is referred to herein as an image or camera image. Accordingly different parts of the camera image are recorded at different instants. As a result the image or video frame captured has distortion if the vehicle is moving fast. The rolling shutter delay can cause errors in creation of maps based on the images, errors in localization based on the images, and distortion in data shown via a viewer application that shows the images.

SUMMARY

Embodiments of the invention perform rolling shutter correction to transform data captured by sensors of a vehicle, for example, cameras or lidar mounted on an autonomous vehicle. The images captured by a rolling shutter camera mounted on a moving vehicle show rolling shutter distortion. The rolling shutter correction transforms the data representing points of scenes to perform rolling shutter compensation, i.e., compensation for the rolling shutter distortion. The rolling shutter compensation ensures that data representing as three dimensional points, for example, data captured by lidar is consistent with data represented in images captured by a rolling shutter camera. The system performs rolling shutter compensation by estimating a distance travelled by the vehicle between the time that the camera captured a point and the time that the image scan was completed and translating the 3D points by the estimated distance.

The system receives an image captured by a rolling shutter camera mounted on a moving vehicle. The image is associated with a distortion axis such that each scan-line of the image scanned by the rolling shutter camera maps to a distinct point along the distortion axis. The distortion axis is associated with a reference point, for example, a point corresponding to the last scan-line of the image representing the completion of the image scan. The system receives a plurality of 3D data points corresponding to the scene captured by the image, for example 3D points captured by a lidar scan. Each of the plurality of points is represented in a three-dimensional space. The system performs the following steps for each of the plurality of 3D points. The system projects the 3D point to the image to obtain a projected point. The system determines a distance of the projected point from the reference point along the distortion axis. The system determines an estimate of a distance travelled by the moving vehicle between the time that the 3D point was captured by the rolling shutter camera and the time that the image scan was completed. The system translates the 3D point to a location along a direction corresponding to the movement of the vehicle by the estimate of the distance. As a result, each 3D point is translated to obtain a translated 3D point. The system stores the translated 3D points. The translated 3D points are consistent with the points of the image. The translated 3D points can be used for displaying in conjunction with the image captured by the rolling shutter camera. For example, the system can project the translated 3D points on the image to obtain an overlapping image such that the projection of the 3D points is aligned with the pixels of the image.

In an embodiment, the system maps 2D points of the image to 3D space. The mapping of 2D points to 3D space can be used to determine a depth of the 2D points. For example, the system can determine a distance of a road sign shown in the image. The system identifies a set of 2D points of the image for translating to 3D space. The 2D points are represented in a coordinate system for representing points of the image. The identified set of 2D points is associated with a shape displayed in the image, for example, a road sign. The system projects a set of the translated 3D points to the image, for example, all points associated with a scene. The system selects a subset of the translated 3D points whose projection falls within the shape displayed on the image. The system fits a plane through the selected subset of translated 3D points. Accordingly, the system obtains a plane corresponding to the shape in the 3D space. The system projects 2D points falling within the shape to the fitted plane to determine a depth of the 2D point. The system further translates the projected 2D point in a direction opposite to the first direction used for performing the rolling shutter compensation, thereby undoing the rolling shutter compensation performed on the 3D points. For example, if the direction in which the 3D point was translated was the direction in which the vehicle was moving while taking the picture, the system undoes the rolling shutter compensation by translating the 3D point in the opposite direction of the vehicle movement. The translated point represents the actual 3D location of the point in the image and can be used to determine a depth of the point, for example, to determine a distance of the sign from the position of the vehicle when the image scan was completed.

BRIEF DESCRIPTION OF THE DRAWINGS

Figure (FIG.) 1 shows the overall system environment of an HD map system interacting with multiple vehicle computing systems, according to an embodiment.

FIGS. 18A-B show the result of performing rolling shutter correction to the data of FIG. 11, according to an embodiment.

Figure 1:
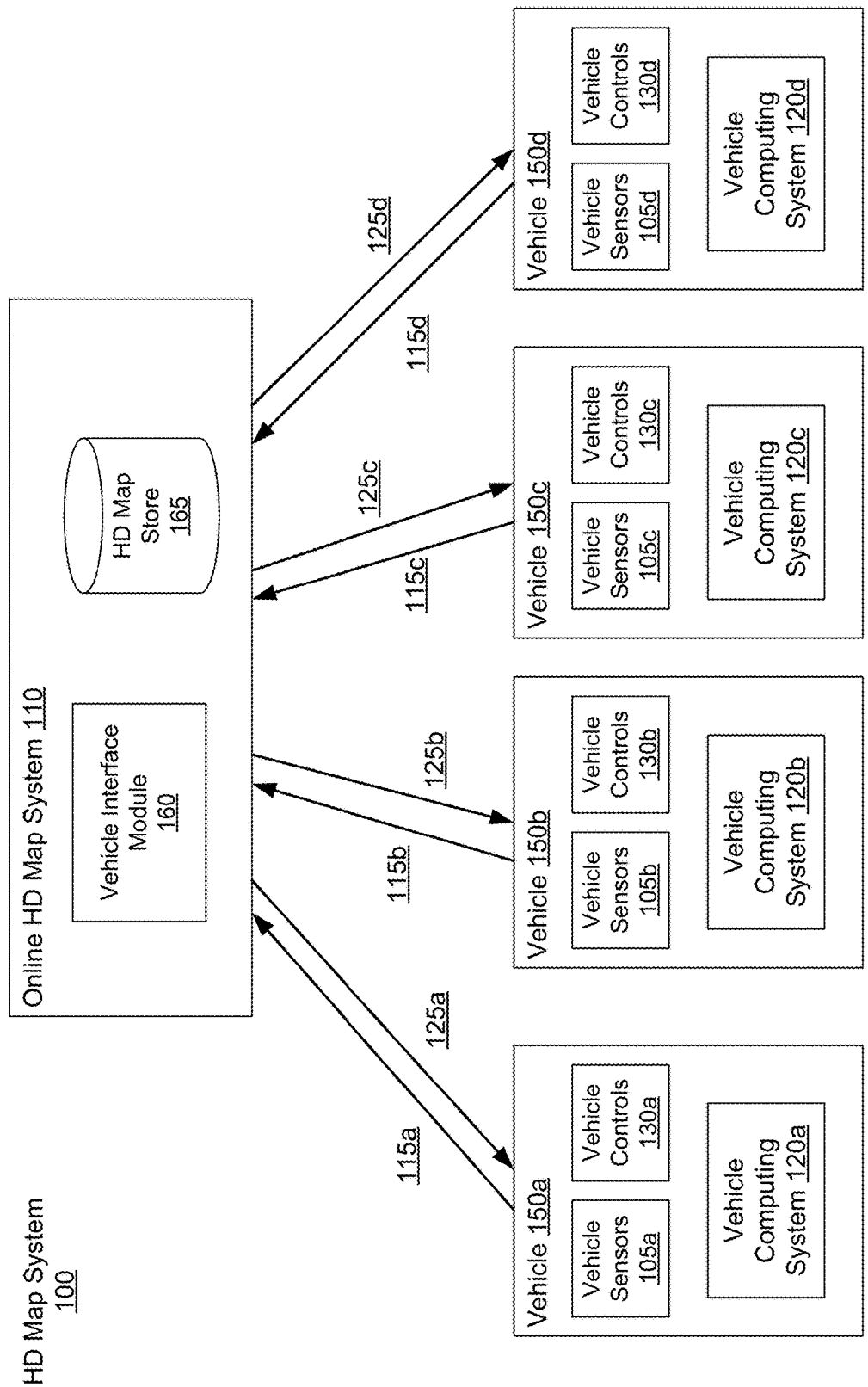

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

Embodiments perform rolling shutter correction for data captured by sensors of an autonomous vehicle. Although various embodiments are described herein in connection with autonomous vehicles, the techniques disclosed are applicable to rolling shutter cameras mounted on any type of vehicle, or rolling shutter cameras that are moving while capturing an image, for example, rolling shutter cameras that may capture images while mounted on a moving drone or a living being such as an animal or on a helmet of a person.

System Environment of HD Map System

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
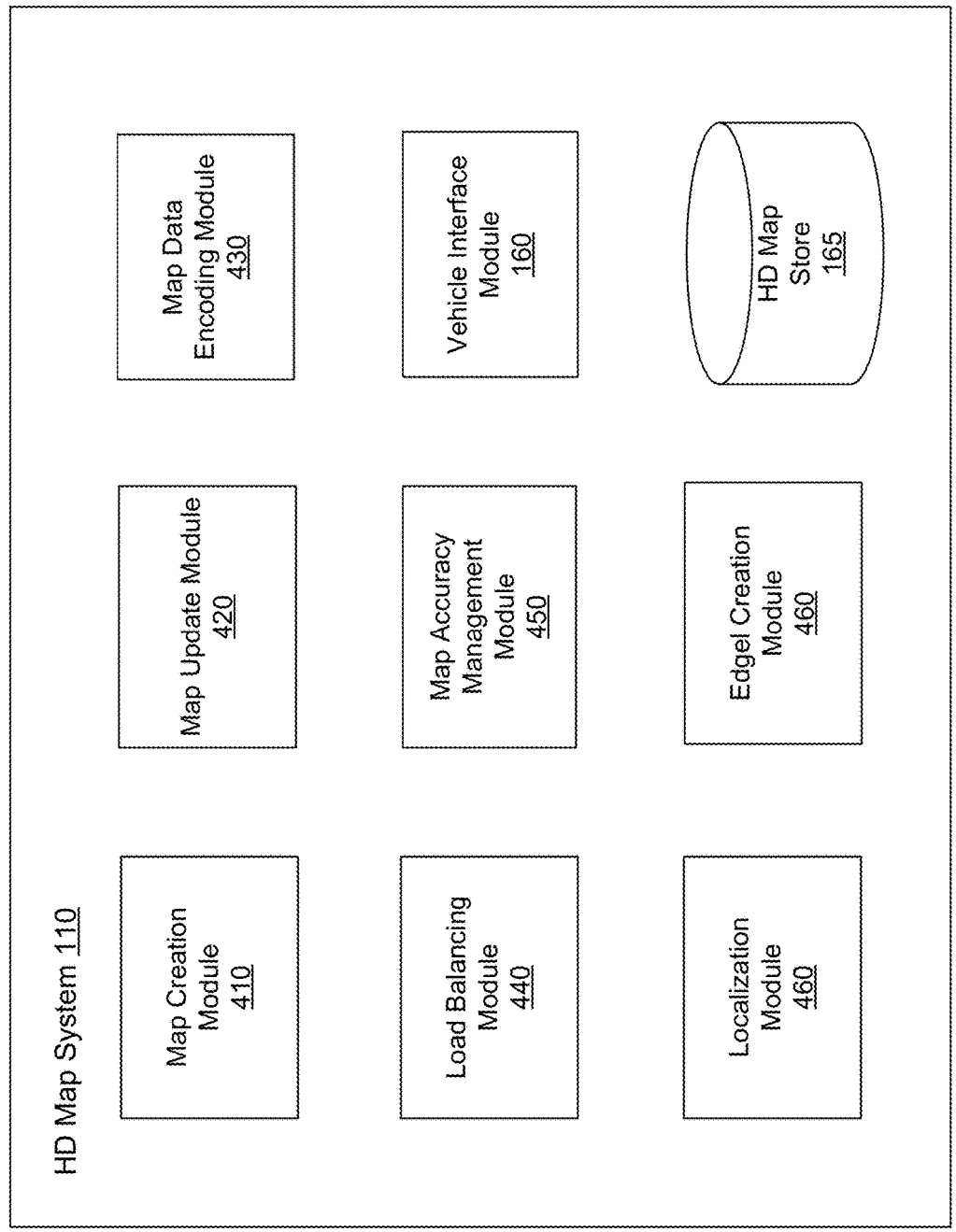
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle.

Some vehicles use a rolling shutter camera. Rolling shutter is a technique by which a camera captures an image in which a still picture or each frame of a video is captured not by taking a snapshot of the entire scene at a single instant in time but rather by scanning across the scene rapidly, either vertically or horizontally. For example, the camera may scan an image sequentially, from one side of the sensor (usually the top) to the other, line by line. Accordingly different parts of the image are recorded at different points in time. However, during playback, the entire image of the scene is displayed at once, as if it represents a single instant in time. This produces distortions if an image of a fast moving object is captured or if the camera is moving on a fast moving vehicle. The rolling shutter camera can be use either a mechanical or electronic device to scan across the scene, for example, many CMOS sensors use rolling shutters. The rolling shutter mechanism provides for increased sensitivity. In contrast, some cameras use a global shutter in which the entire frame is captured at the same instant. If a global shutter camera was compared with a similar rolling shutter camera, the rolling-shutter camera is likely to have less noise and a wider dynamic range and generates less heat. If a global-shutter camera was developed to compensate for those aspects, the costs of manufacturing such a global shutter camera will be significantly higher. Therefore, rolling shutter camera provide good performance at low cost.

A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Vehicle Computing System

Figure 2:
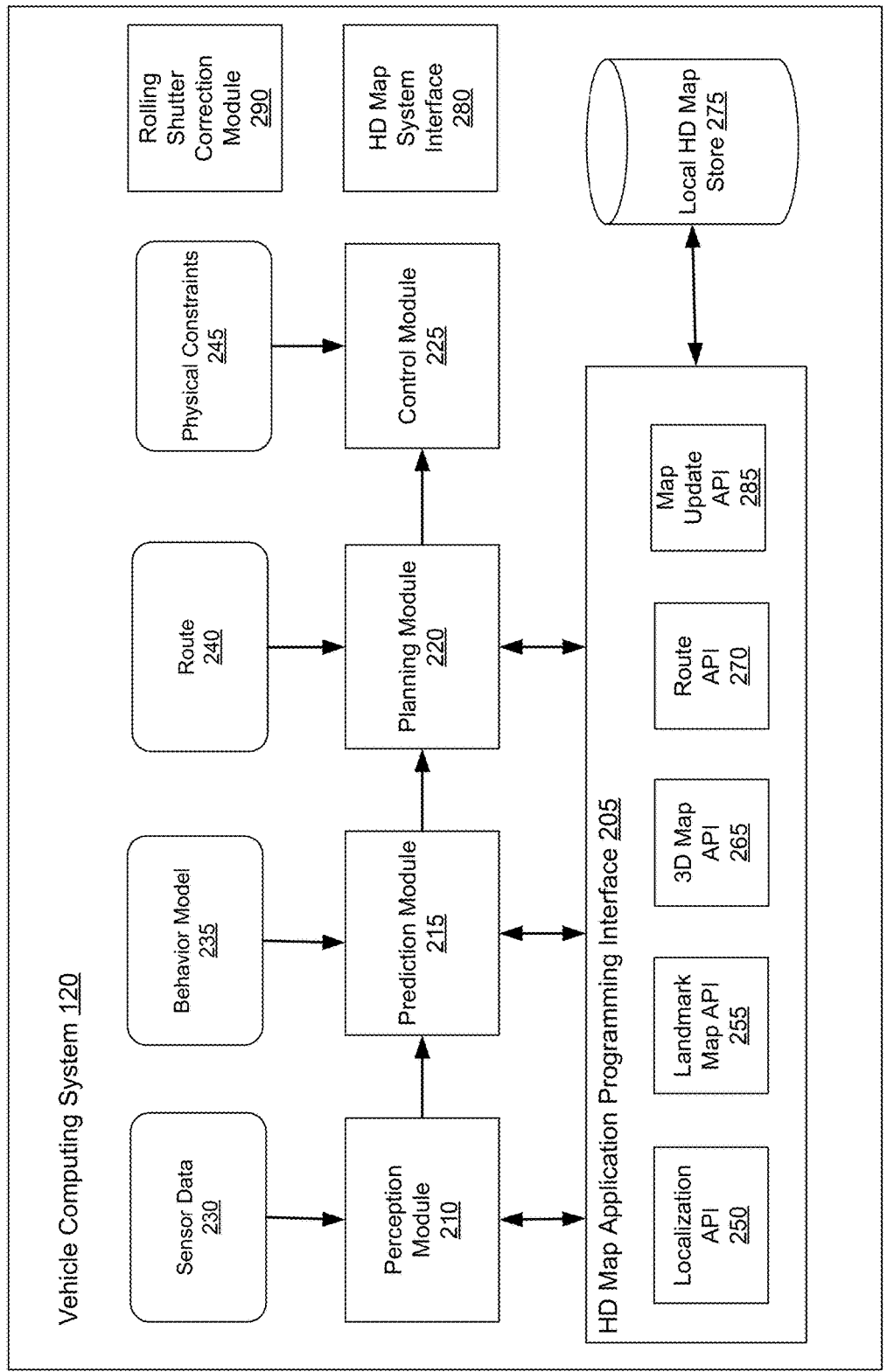
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a rolling shutter correction module 290, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The rolling shutter correction module 290 performs correction of data captured by sensors of a vehicle as to perform rolling shutter correction. The processes performed by the rolling shutter correction module 290 are described herein in further details. In some embodiments, the rolling shutter correction module 290 is executed in the online HD map system 110. In other embodiments some functionality of the rolling shutter correction module 290 is executed in the vehicle computing system 120 and some functionality in the online HD map system 110.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
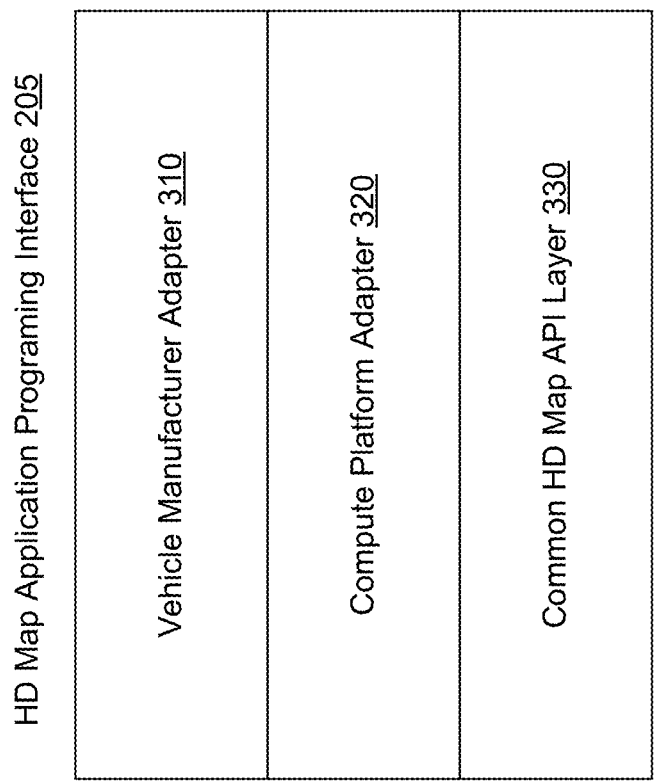
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a computer platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of computer platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
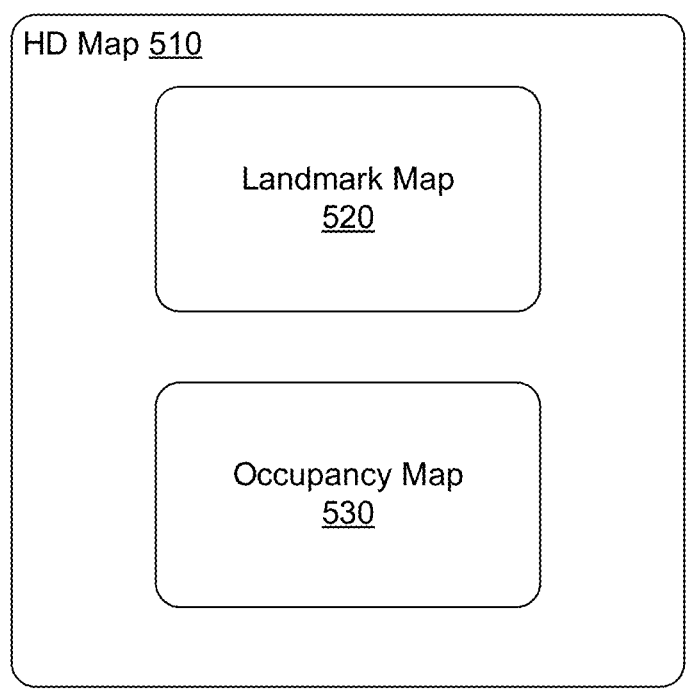
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map (OMap) 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
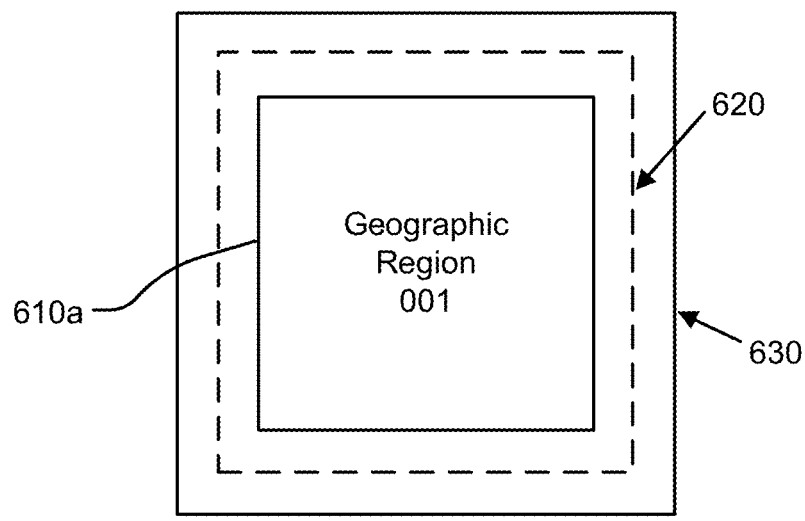
FIGS. 6A-B illustrate geographical regions defined in an HD map, according to an embodiment.
Figure 6B:
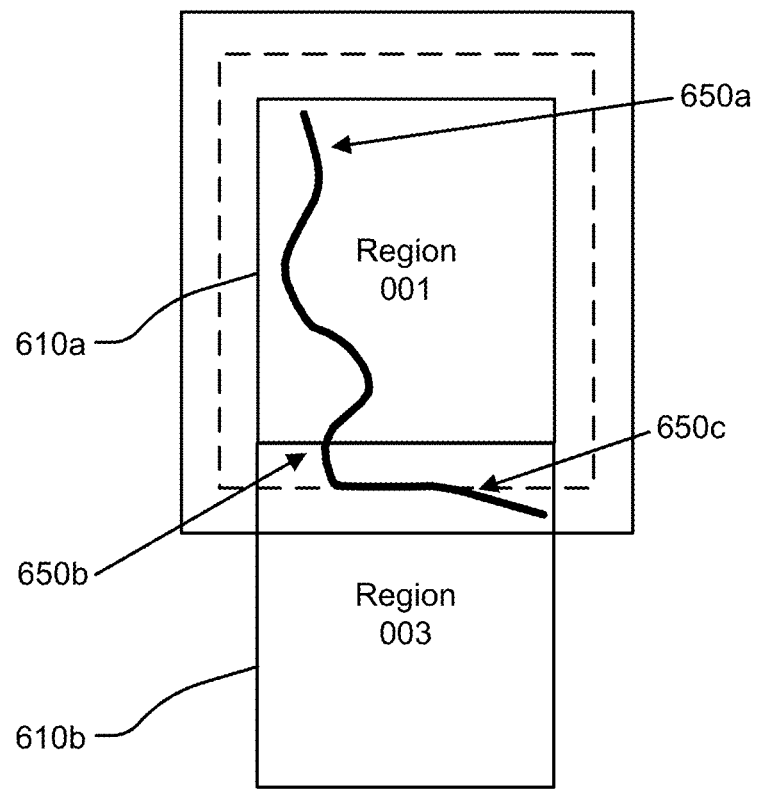

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
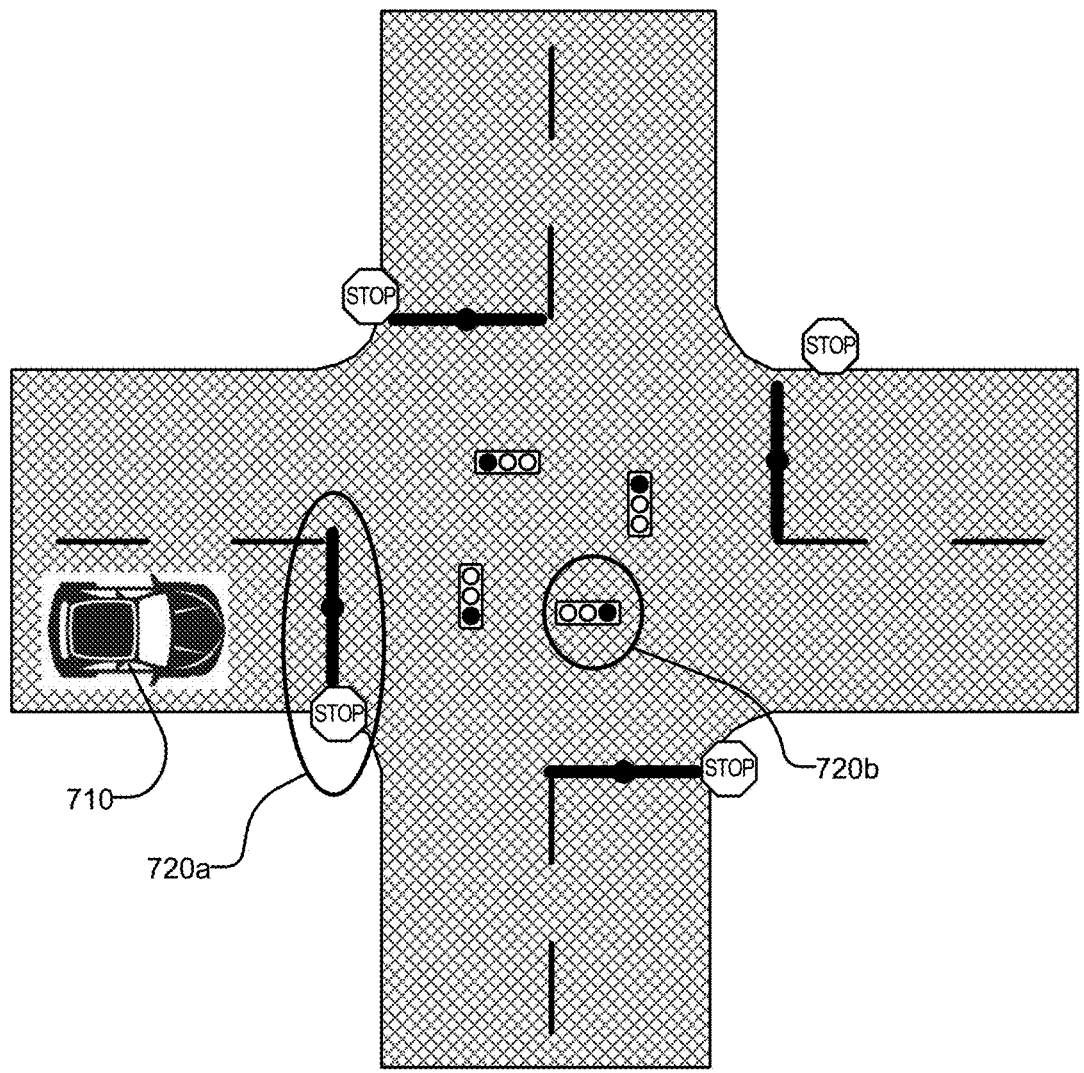
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
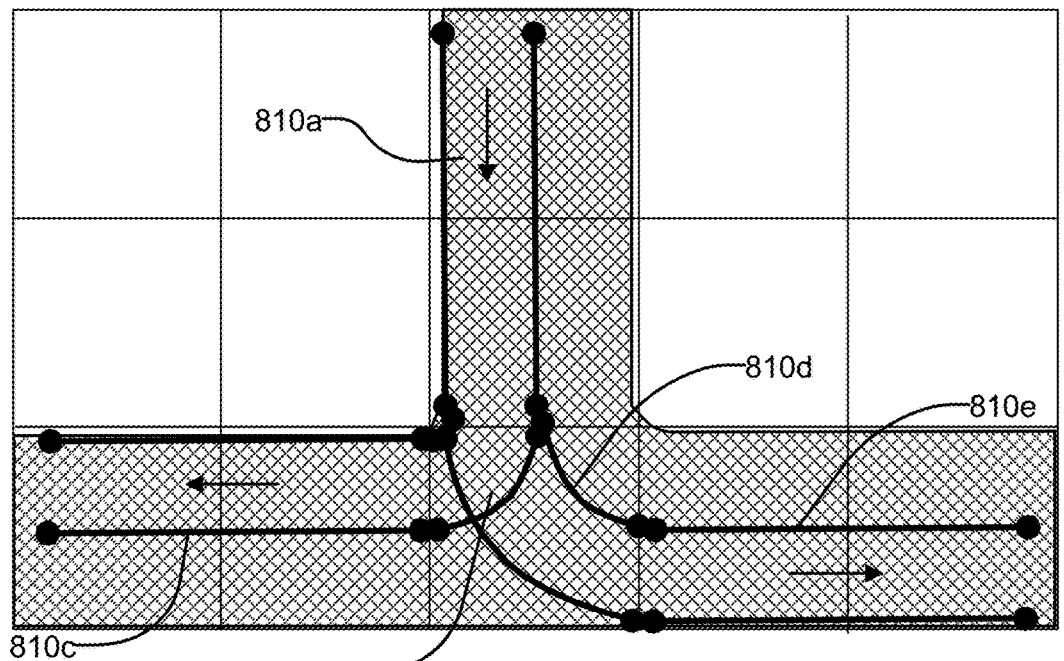
FIGS. 8A-B illustrate lane elements and relations between lane elements in an HD map, according to an embodiment.
Figure 8B:
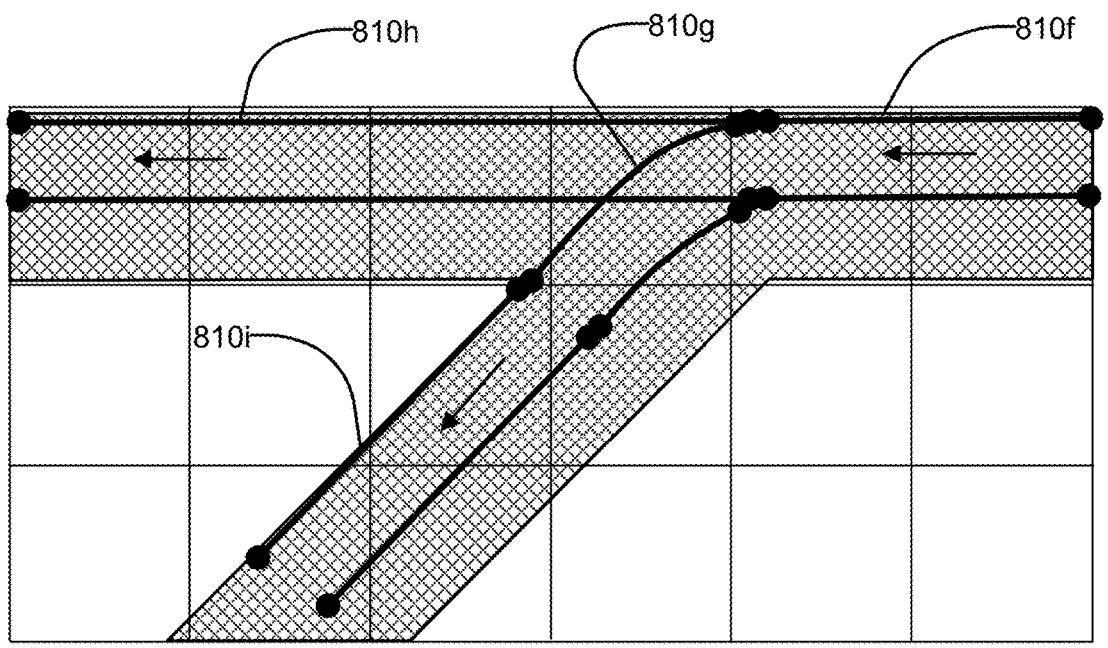

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Coordinate Systems Used by HD Map System

Figure 9A:
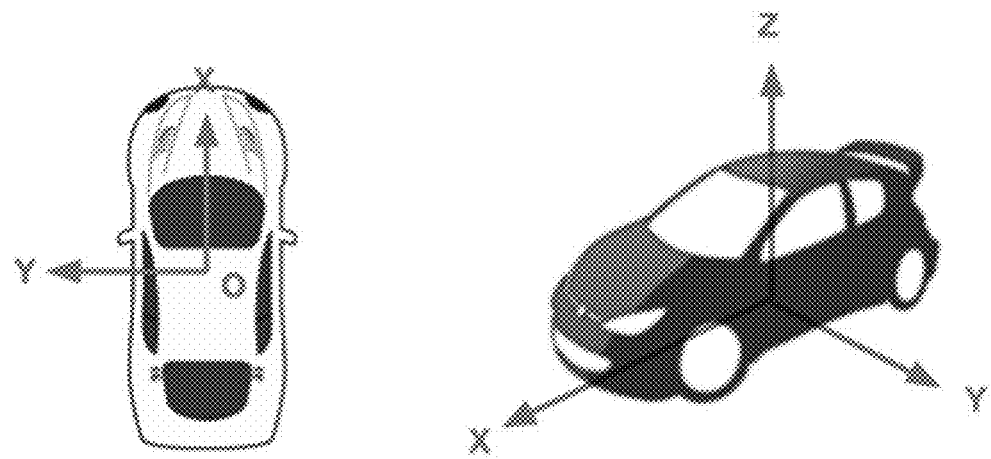
FIGS. 9A-C show various coordinate systems that may be used by the HD map system, according to an embodiment.
Figures 9B, 9C:
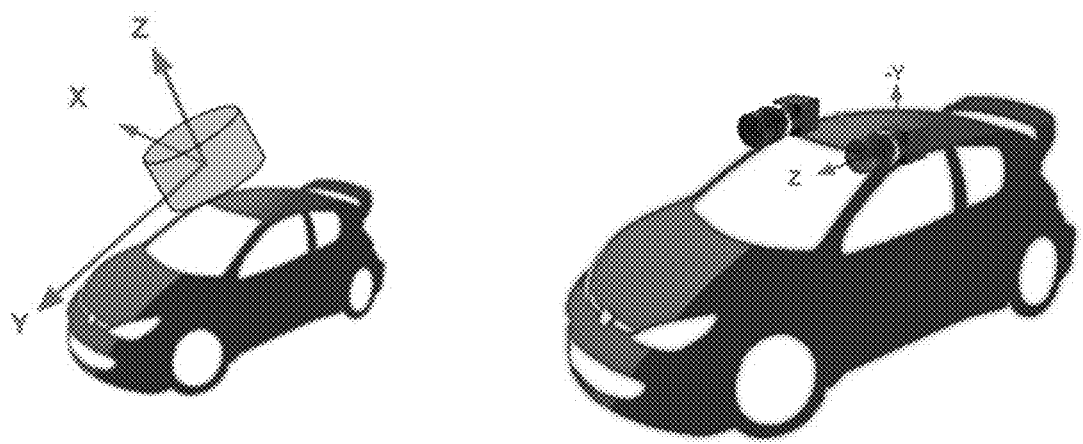

The HD Map system deals with a number of coordinate systems. FIGS. 9A-B show various coordinate systems that may be used by the HD map system, according to an embodiment.

FIG. 9A illustrates a vehicle coordinate system. Each vehicle may be slightly different but the vehicle coordinate system is defined as follows: the x-axis is in forward facing direction, the y-axis is to the left when facing forward, and z-axis is pointing upwards. The units can be meters but could be any other unit of length. The origin is on the ground near center of the car with z-coordinate of origin at ground level and x and y coordinates of the original near center of the car. In some embodiments, the x and y coordinates of the vehicle are assumed to be at the center of the lidar.

A world coordinate systems is defined using latitude in degrees, longitude in degrees, and altitude in meters relative to sea-level. The world coordinate system is based on WGS84 which is a revision of the World Geodetic System (WGS) used by GPS.

A world pose coordinate system describes the global position and heading/orientation of a vehicle. The World Local Cartesian coordinate system is defined for each latitude, longitude, and altitude. The origin of the world pose coordinate system is at the point on the WGS84 sphere adjusted by Altitude. The coordinate frame axes are defined as: =EASTING, Y=NORTHING, and Z=UP (away from center of the sphere). The world pose comprise the latitude, longitude, and altitude that define the position of the origin of the car coordinate system in world coordinates and axis angle in degrees representing the rotation transform that converts the car's vehicle coordinates to world local cartesian coordinates at the given latitude, longitude, and altitude. For example, [1, 0, 0] in car coordinate system is a vector of length 1m facing forward. The world pose provides a concise way to specify the location and orientation of a car at any point on the earth.

FIG. 9B illustrates a lidar coordinate system. In the lidar coordinate system, the x-axis points to the right, y-axis points forward, and z-axis points upwards, and all units may be in meters or another unit of length measurement. The origin of the coordinate system is at the physical center of the puck device. During calibration, the HD map system determines the coordinate transform to map the lidar coordinate system to the car centric coordinate system as follows: $P_{car}=T_{l2c} P_{lidar}$. $P_{car}$ is used for alignment and processing.

FIG. 9C illustrates a stereo camera coordinate system. A vehicle may use two forward facing cameras. The cameras are calibrated to compute: lens distortion parameters, epipolar lines (i.e., coplanar lines of image data between the two cameras), internal camera parameters (focal length, focal center, field of view), external camera parameters: origin and orientation of the RIGHT camera relative to the LEFT camera.

For each stereo image pair, the HD map system computes correspondences between the images, triangulates them, and produces a point. This point is in the coordinate system of the left camera. The cameras are calibrated using a target that is specified in meter units, so the coordinate system of the cameras are in meters after applying the triangulation. The left camera coordinate system has x-axis to the right, y-axis pointing down, and z-axis facing forward. All axes may use meters as units of distance measurement. The origin of the coordinate system is at the center of focus of the camera (inside the camera body). The HD map system performs calibration to determine the coordinate transform to map the stereo camera coordinate system to the car centric coordinate system as follows: $P_{car}=T_{stereo2c} P_{stereo}$. The HD map system uses $P_{car}$ for alignment and processing.

Figure 10:
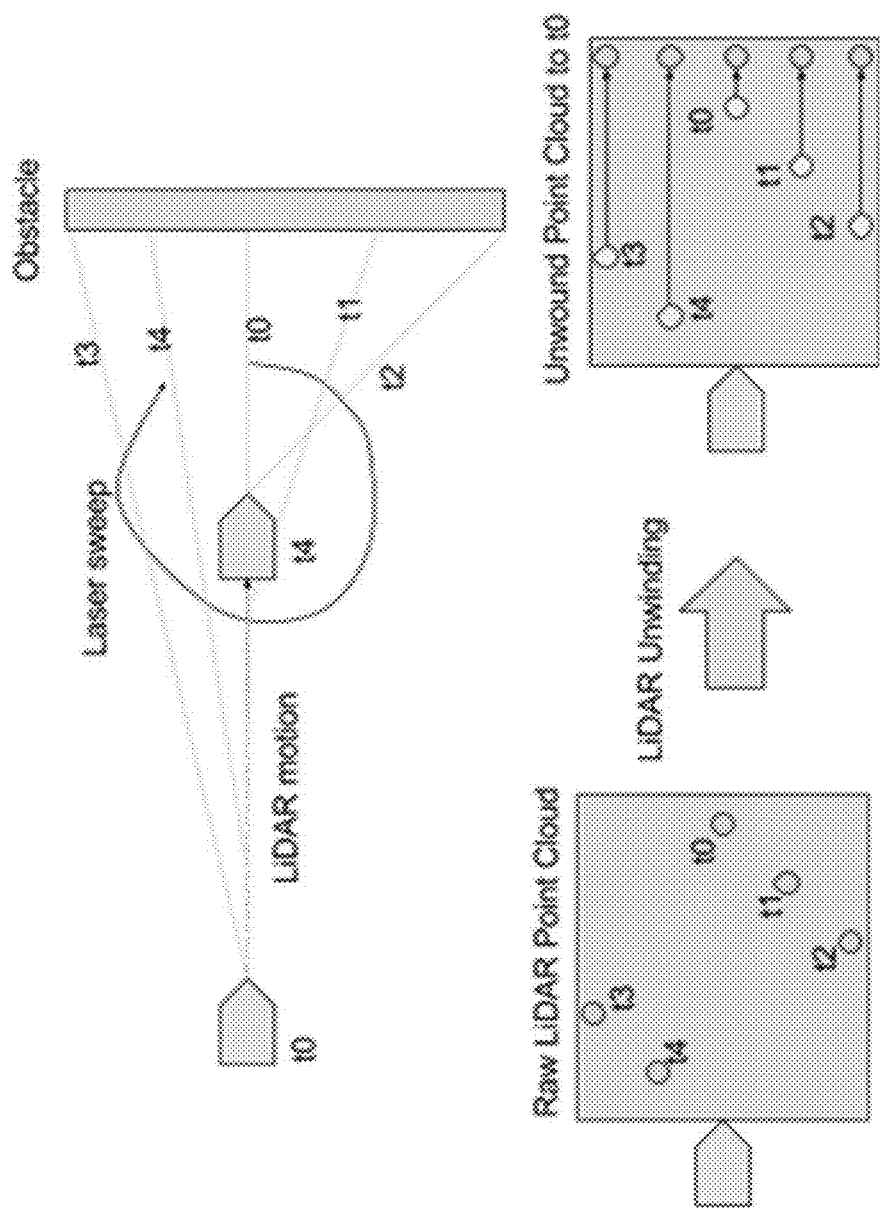
FIG. 10 illustrates the process of unwinding a point cloud, for example, a point cloud generated by a lidar, according to an embodiment.

FIG. 10 illustrates the process of unwinding a point cloud, for example, a point cloud generated by a lidar, according to an embodiment.

The raw data packages received from LiDAR can be used to create create a point cloud based on the assumption the sensor itself does not change its location during the course of the LiDAR scan. This assumption is not true since the LiDAR is mounted on a moving vehicle. For example, the vehicle may be traveling at 65 mile per hour speed. Accordingly, a LiDAR sampling at 10 HZ can travel up to 3.5 m during each scan. Therefore, embodiments transform the point cloud data using an unwinding transform that compensates for the motion of the LiDAR and transforms the raw data packages to a point cloud that is consistent with the real world.

To recover the true 3D point cloud of the surrounding environment relative to the LiDAR's location at a specific timestamp, the HD map system compensates the LiDAR's motion during the course of scanning the environment. This motion compensation operation is referred to as "unwinding" and the transform applied for unwinding is referred to as the unwinding transform.

Assume the motion the LiDAR moved during the scan as T. Since LiDAR beams can be identified via its row and column index in the rage image, the HD map system can derive the relative timing of each LiDAR beam relative to the starting time of the scan. Using a linear motion interpolation, the HD map system moves each LiDAR beam according to its interpolated motion relative to the starting time. After adding this additional motion compensation to each LiDAR beam, the HD map system recovers the static world environment as an unwound point cloud.

There are three ways to estimate the LiDAR's relative motion (T), i.e., the unwinding transform, during the course of each scan: (1) Using GPS-IMU, (2) Run pairwise point cloud registration using raw, consecutive LiDAR point clouds, (3) Performing a global alignment of various point clouds and computing the relative transform from the adjacent LiDAR poses.

Rolling Shutter Effect

Examples of rolling shutter cameras used by vehicles include GMSL cameras that are compatible with the PX2 compute platform. These types of cameras are also used by several different types of cars by various manufacturers. The rolling shutter delay represents the time taken to scan from the first row (or column) to the last row (or column) and is typically close to the fastest frame rate supported by the camera. Thus, if a camera supports up to 30 fps (frames per second), the rolling shutter delay is usually about 30 milliseconds.

A rolling shutter camera captures an image in which a still picture (if the camera represents a still camera) or each frame of a video (if the camera represents a video camera) is captured by scanning across the scene rapidly, either vertically or horizontally. As a result, not all parts of the image of the scene are recorded at exactly the same instant. During playback, the entire image of the scene may be displayed at once, as if it represents a single instant in time. This results in distortions in the image, for example, if the camera captures an image of a fast-moving object or rapid flashes of light. In contrast, a global shutter camera capture an entire image or an entire frame at the same instant.

However, rolling shutter cameras are more cost effective compared to global shutter cameras. Accordingly, embodiments of the invention allows images captured by rolling shutter cameras to provide same level of accuracy as global shutter cameras for specific purposes, for example, for use in tools for generating high definition maps used for driving autonomous vehicles. Although the following discussion refers to rolling shutter cameras that capture an image/frame row by row, the techniques disclosed apply to any other type of rolling shutter camera, for example, rolling shutter cameras that capture images/frames column by column.

If the last row of pixels is considered to be showing the scene at present, the first row of pixels are showing the scene 30 milliseconds in the past. For a moving car, the scene can change significantly during 30 milliseconds. If the car travels at 60 mph (about 100 km/h), the scene will appear to move to the camera by about 80 centimeters during the rolling shutter delay between the first row of the image and the last row, causing distortion for some of the objects in the image. The distortion is more visible when the object projection is near the top of the image, which has the largest rolling shutter delay. The distortion is also more visible if the object is close to the car in 3D, for example, near the boundary of the image, since its movement during the rolling shutter delay translates into the largest pixel offset in the image.

Embodiments of the invention correct the data captured by sensors of the vehicle for rolling shutter effect, such that the projection of 3d points (lidar, Occupancy Map or OMap points, or feature vertices) is consistent with image pixels. This correction may be applied to both 3d-to-2d projection (e.g., for OMap coloring) and 2d-to-3d projection (e,g., for feature generation). This ensures that (1) data from both lidar (geometry and intensity) and camera (color and features) is consistent within the OMap, and (2) camera-based localizer and demo viewer show feature projection at correct locations on the image. The data that is corrected for rolling shutter effect is displayed via user interfaces, for example, user interfaces of applications/tools used for generation of HD map. For example, such a tool may be used for testing, verifying HD map data. Without the rolling shutter correction the data captured by different sensors (for example, lidar and camera) is inconsistent. As a result, a user interfaces that displays overlapped data from different sources (for example, overlaps camera images with OMap data or overlaps lidar data and camera images) displays inconsistent data and would provide a poor user interface. Embodiments of the invention transform the data captured by sensors such that the transformed data is consistent, thereby providing a better user interface for tools used for development of HD maps.

Figure 11B:
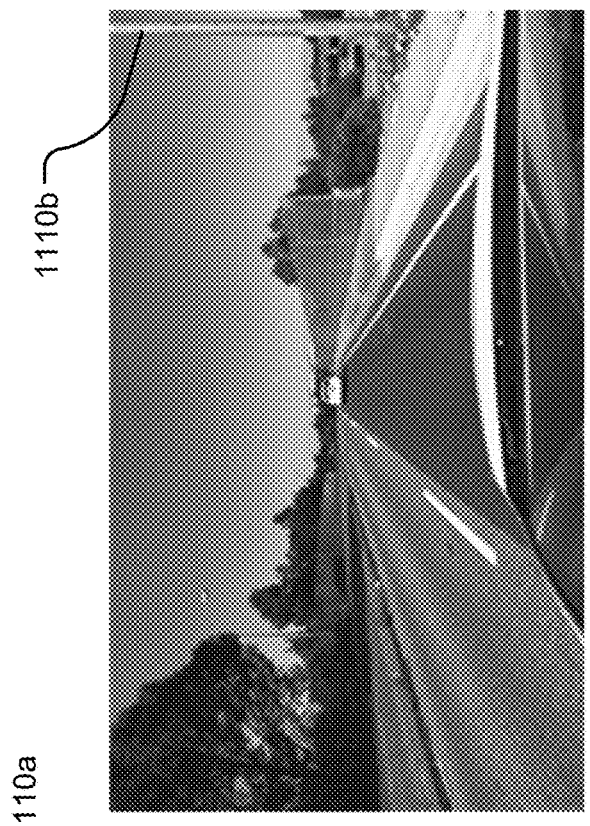
FIGS. 11A-B illustrate the effect of rolling shutter in an image captured by a vehicle that is moving.
Figure 11A:
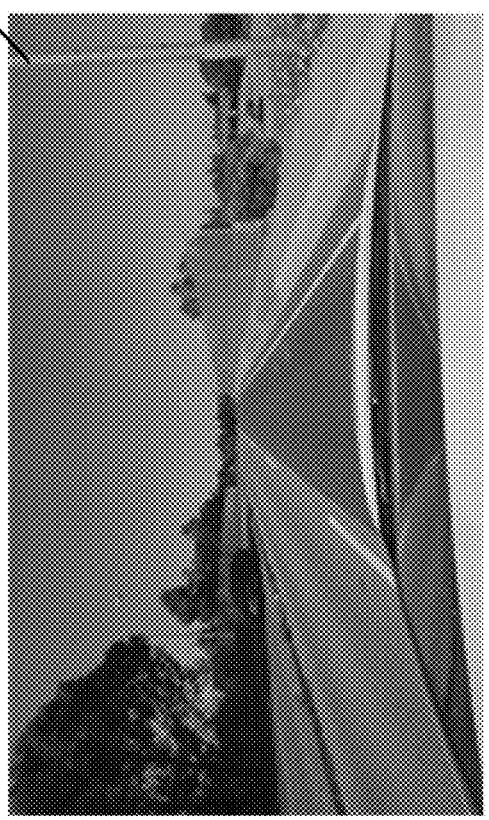

FIGS. 11A-B illustrate the effect of rolling shutter in an image captured by a vehicle that is moving. The images shown in FIG. 11A and 11B are captured by two cars driving the same route. FIG. 11A shows an image captured by a rolling shutter camera, and FIG. 11B shows an image captured by a global shutter camera that has no rolling shutter delay. The two figures show images captured at the same spot. The cars were traveling at about 40 mph in the second row. The pole 1110a shown in FIG. 10A compared to the pole 1110b in FIG. 10B shows an inward distortion for the rolling shutter camera. The amount of distortion grows as the cars travel at a higher speed, and as the object approaches image boundary since the 3d movement translates into the largest pixel offset.

Figure 11C:
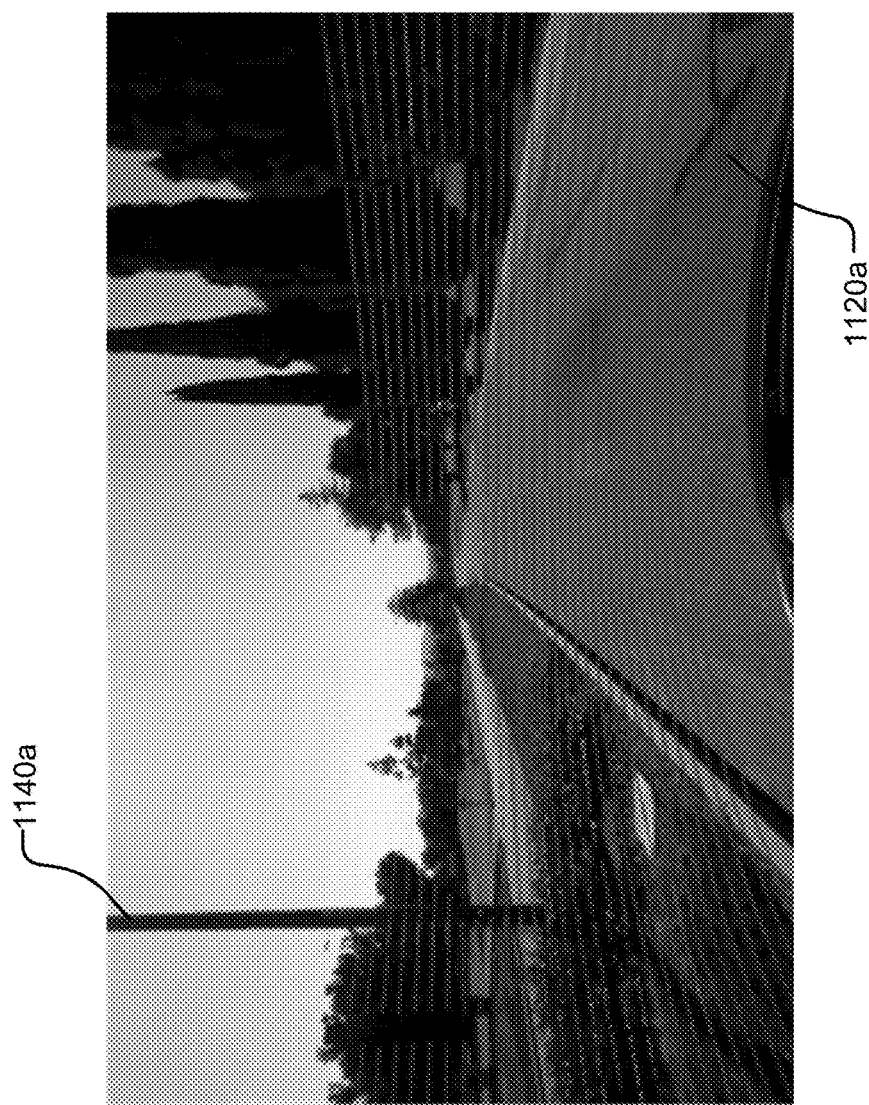
FIGS. 11C-D illustrate the effect of rolling shutter delay in lidar-to-image projection.
Figure 11D:

FIGS. 11C-D illustrate the effect of rolling shutter delay in lidar-to-image projection. FIG. 11A shows the view from a moving vehicle showing a pole 1140A. FIG. 11B shows a zoomed-in view 1140B of the pole. The lidar image is overlapped on the corresponding image taking by a rolling shutter camera. The lines 1120 shown in the image represent the lidar scans. The lidar points appear to be off, for example, as shown by the arrow 1130. The closer to the top of the image, the bigger the offset, because pixels closer to the top of the image are showing the scene more into the past. The projection of lidar points, on the other hand, correspond to the position where the pole should be in the image if the image did not have rolling shutter effect, for example, if the image was captured using a global shutter camera.

Figure 12B:
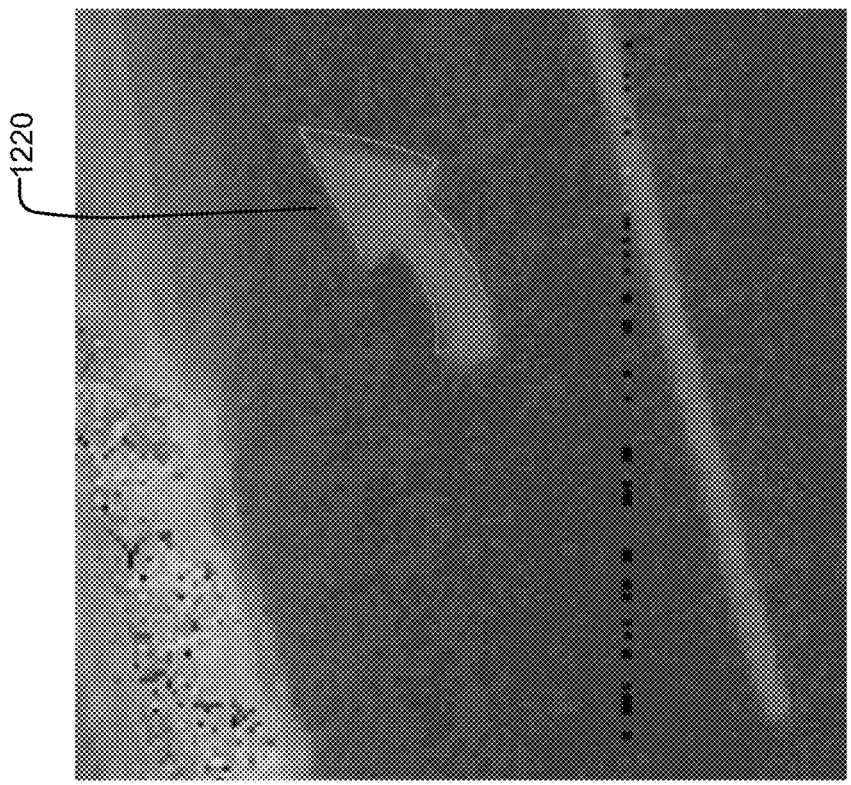
FIGS. 12A-B illustrate the effect of rolling shutter delay in OMap coloring.
Figure 12A:
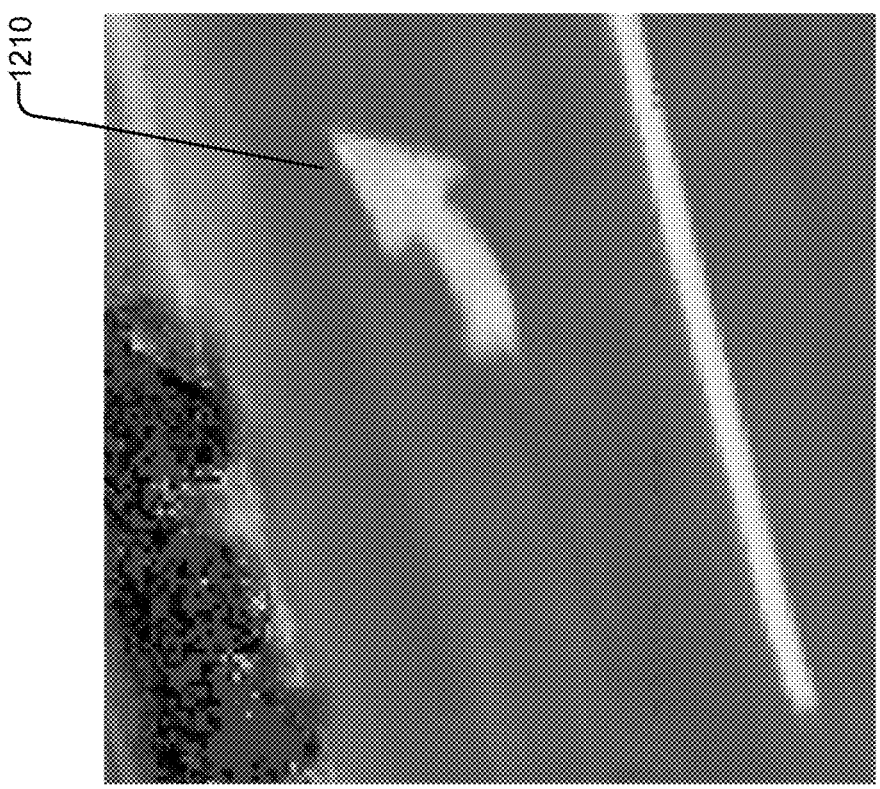

FIGS. 12A-B illustrate the effect of rolling shutter delay in an OMap. FIG. 12A shows an OMap colored from camera images. The image in FIG. 12A shows an arrow 1210 that may represent a sign on the road. FIG. 11B shows OMap intensity from lidar. Outline 1220 of the arrow 1210 from the RGB image of FIG. 12A is copied to the same pixel location in the intensity image shown in FIG. 12B. Compared to the intensity image, the arrow 1210 has a slight shift in the longitudinal direction in the RGB image (towards the direction of travel). The shift is about 3 pixels, which translates into 15 centimeters.

Figure 13B:
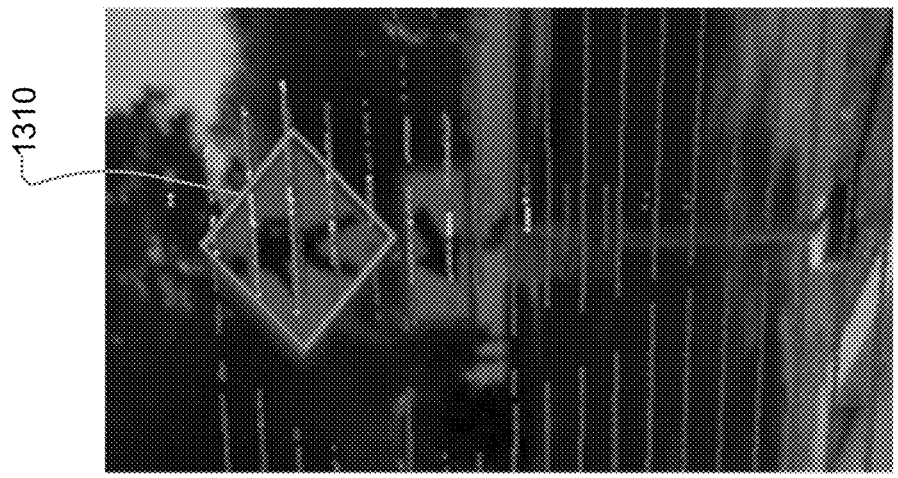
FIGS. 13A-B illustrate the effect of rolling shutter delay in feature projection.
Figure 13A:
Figure 14:
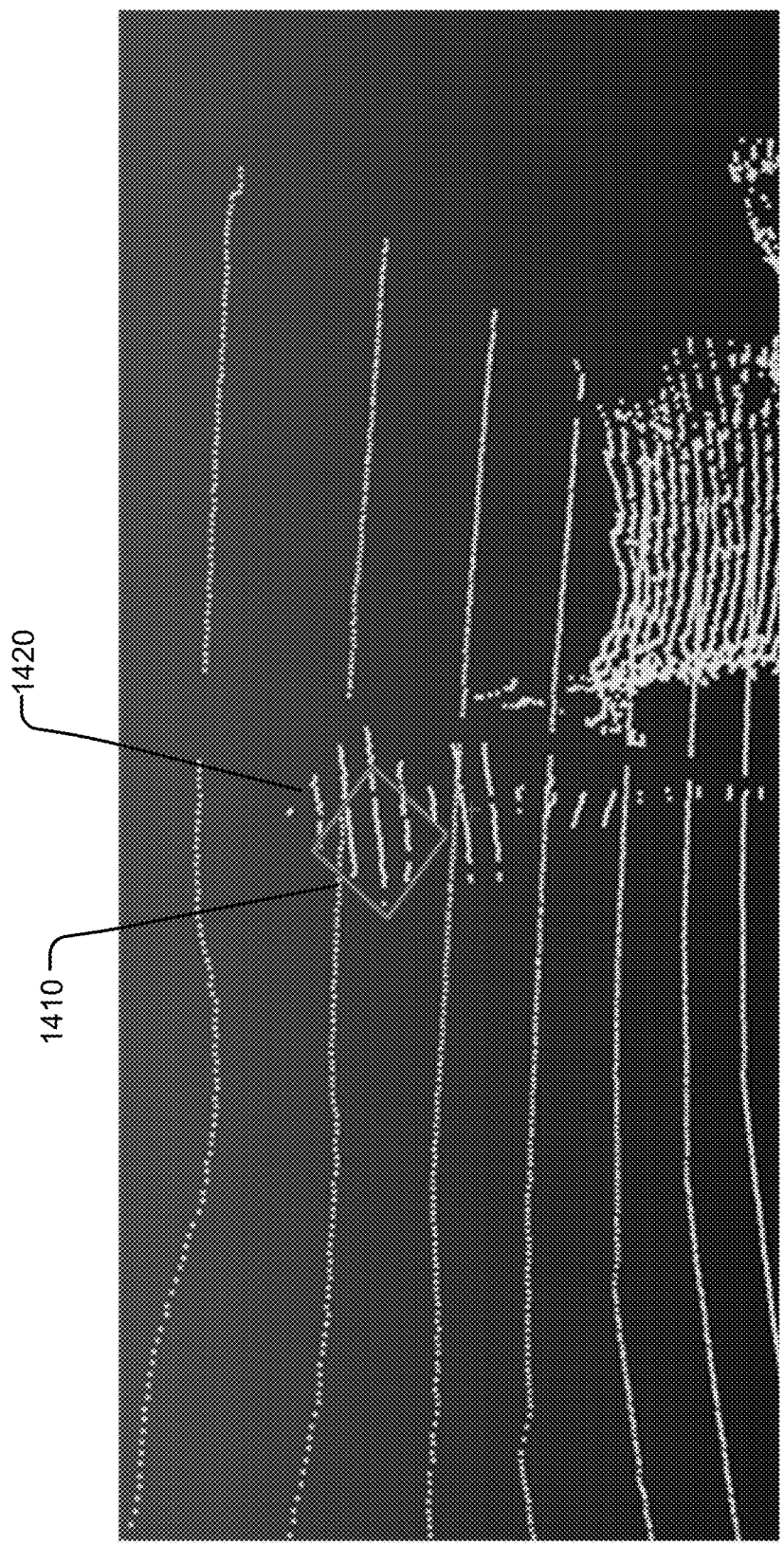
FIG. 14 shows the lidar image and the position of the road sign based on the image data, according to an embodiment.

FIGS. 13A-B illustrate the effect of rolling shutter delay in feature projection. FIG. 13A shows lidar-to-image projection on a view captured by sensors of a vehicle. The view includes a road sign 1310. FIG. 13B shows a zoomed in view of the road sign 1310. A polygon is shown around the traffic sign. Due to the rolling shutter delay, the image of the road sign is not displaying the sign at its present location, but at a position that is 10 s of milliseconds in the past. FIG. 14 shows the lidar image and the position of the road sign based on the image data, according to an embodiment. The present location of the road sign is shown by the lidar projection 1420. The polygon 1410 as seen in the image is off compared to actual position of the road sign that matches the lidar projection 1420. Accordingly, the 3D coordinate of the feature representing the road sign is also off, as shown in FIG. 14. Note that the lidar image is shown based on lidar data that is unwound to compensate for vehicle movement. This results in inconsistency between features and OMap geometry as represented in the high definition map.

Process for Rolling Shutter Correction

Figure 15:
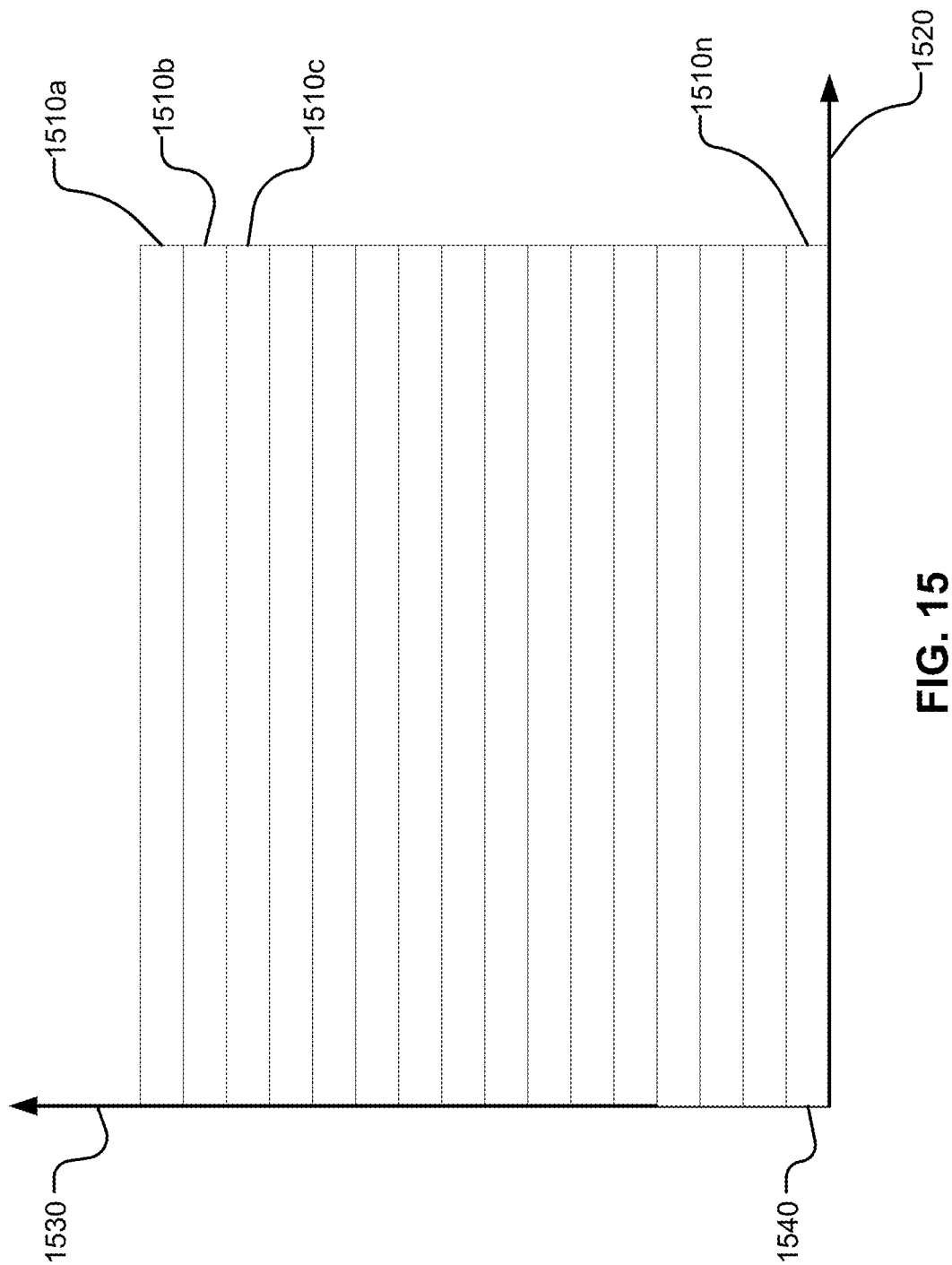
FIG. 15 illustrates an image captured by a rolling shutter camera, according to an embodiment.

FIG. 15 illustrates an image captured by a rolling shutter camera, according to an embodiment. The rolling shutter captures the image scan-line by scan-line. FIG. 15 shows the scan-lines 1510 as horizontal slices of the image. As shown in FIG. 15 the rolling shutter captures the image from top to bottom. Accordingly the top most scan-line 1510a is captured first, followed by the second scan-line 1510b, followed by the third scan-line 1510c, and so on until the last scan-line 1510n. The image scan is completed after the last scan-line 1510n is captured.

FIG. 15 shows two axes associated with the image, the x-axis 1520 and the y-axis 1530. The distortion of the image occurs along the y-axis 1530 due to movement of the vehicle on which the camera is mounted. Accordingly, in FIG. 15, the y-axis 1530 is referred to as the distortion axis. FIG. 15 illustrates an image captured by a rolling shutter camera that captures images row by row. In some embodiments, the rolling shutter camera may capture the image column by column. In this embodiment, the scan-lines are vertical instead of being horizontal as shown in FIG. 15 and the distortion axis is the x-axis 1520.

Each scan-line of the image scanned by the rolling shutter camera maps to a distinct point along the distortion axis. The point may be one of the points along which the scan-line intersects the distortion axis. The distortion axis associated with a reference point from which distances of scan-lines may be measured. In an embodiment, the reference point is a point on the distortion axis that is associated with the last scan-line 1510n that is captured for the image by the rolling shutter camera. The last scan-line 1510 represents the completion of the scan of the image. Accordingly, the reference point represents the time of completion of the scan of the image.

The processes for performing rolling shutter correction is described as follows. The process for performing rolling shutter correction uses 3D coordinates of any point to be projected, for example, 3D coordinates of 3D points obtained from lidar, OMap, or feature vertices, converted to camera coordinates. If the HD map system obtains the 3D coordinates of a 3D point from lidar, the point should also have been previously unwound as illustrated in FIG. 10. The unwinding process shifts different 3D points of the lidar scan (or any point cloud representation) by different amounts to account for vehicle motion during the lidar scan.

The HD map system stores following information: a camera projection matrix P, image dimensions (for example, height H), rolling shutter delay per frame r (this number is a constant and can be obtained from a camera's data sheet), vehicle motion during this frame. For the purpose of rolling shutter correction, the HD map system assumes constant motion during the course of a frame. On an embodiment, the HD map system determines the vehicle motion from consecutive vehicle poses and represented by a rigid transform T. It is assumed that T has been converted to camera coordinate via camera-to-car transform. The length of the frame is assumed to be t milliseconds.

Figure 16:
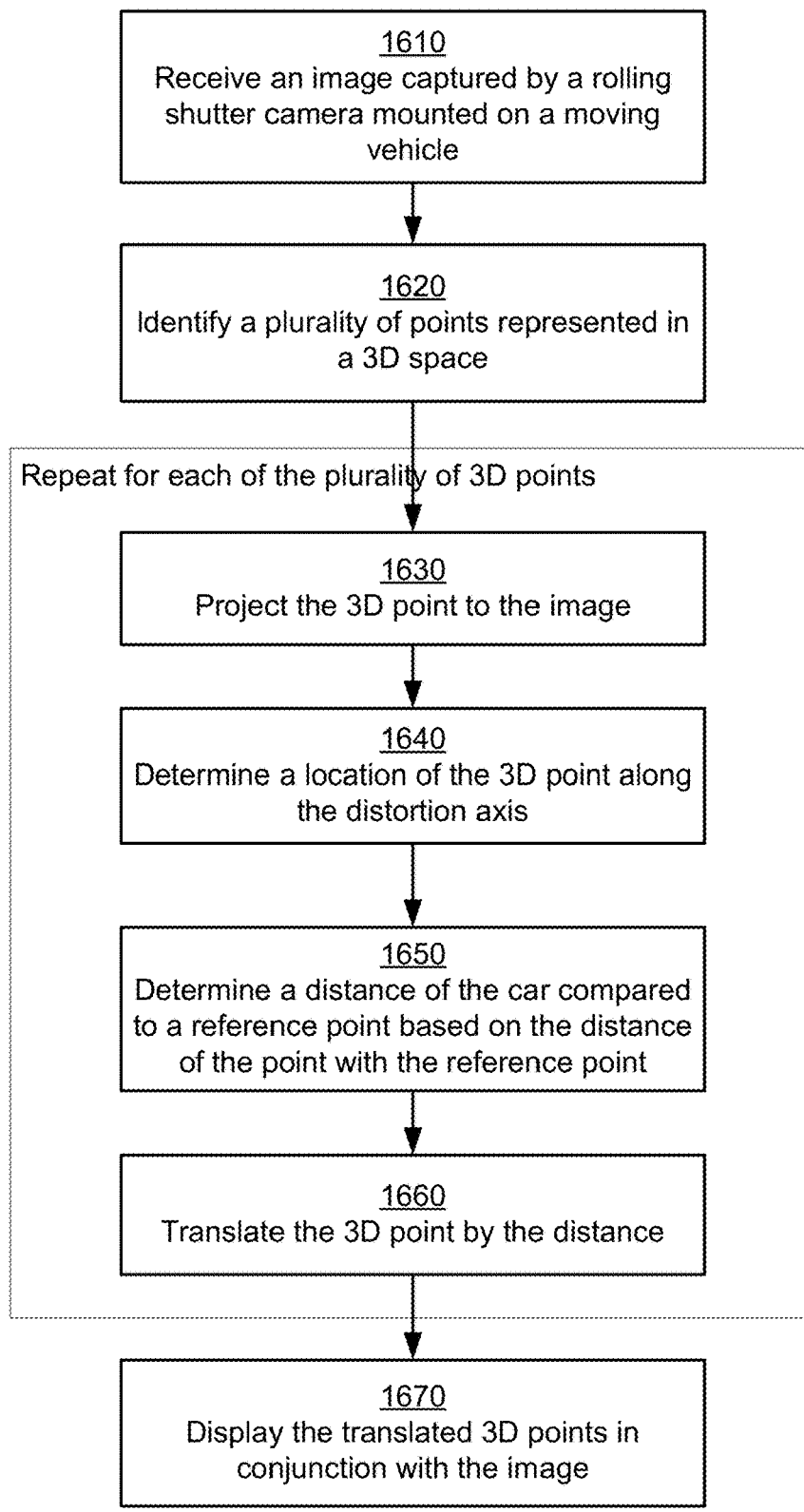
FIG. 16 shows a flowchart illustrating the process of transforming 3D points for performing rolling shutter correction, according to an embodiment.

FIG. 16 shows a flowchart illustrating the process of transforming 3D points for performing rolling shutter correction, according to an embodiment. The rolling shutter correction module 290 receives 1610 an image captured by a rolling shutter camera mounted on a moving vehicle. The rolling shutter correction module 290 identifies 1620 a plurality of 3D data points corresponding to the scene captured by the image. Each of the plurality of points is represented in a three-dimensional space.

For each of the plurality of 3D points, the rolling shutter correction module 290 performs the steps 1630, 1640, 1650, and 1660. The rolling shutter correction module 290 projects the 3D point to the image coordinates to obtain a projected point. In an embodiment, the rolling shutter correction module 290 uses the projection matrix P to project 3D point X to image assuming there was no rolling shutter delay. The projection is performed by determining the product of the matrix P and X, for example, as shown by equation (u, v, w)=P*X. This equation can be rewritten as (x, y) =(u/w, v/w) where (x, y) is the projected image coordinate.

The rolling shutter correction module 290 calculates the amount of rolling shutter delay when the 3D point is captured. Since rolling shutter rate is constant, the HD map system can compute this delay based on the y coordinate (row index) of the projection: d=r*y/H, where r is the rolling shutter delay per frame, H is the height of the image. The unit of d is in milliseconds. To compensate for the rolling shutter delay, the HD map system moves the point backward to where it was d milliseconds ago using the equation X←(d/t)*T*X.

Accordingly, the rolling shutter correction module 290 determines 1640 a location of the 3D point along the distortion axis. The rolling shutter correction module 290 determines a distance of the projected point from the reference point along the distortion axis. The rolling shutter correction module 290 determines 1650 an estimate of a distance travelled by the moving vehicle between the time that the 3D point was captured by the rolling shutter camera and the time that the image scan was completed. The rolling shutter correction module 290 transforms the 3D point by translating the 3D point to a location along a direction Q corresponding to a direction of movement of the vehicle by the estimate of the distance travelled by the moving vehicle. The transformation is performed for each 3D point of a point cloud, thereby generating a transformed point cloud. The rolling shutter correction module 290 stores the translated 3D points for displaying in conjunction with the image captured by the rolling shutter camera. In an embodiment, HD map system displays 1670 the translated 3D points in conjunction with the image, for example, via an application/tool used for generation of HD maps. The resulting image presents a consistent view of the 3D points as well as the pixels of the image.

Figure 17:
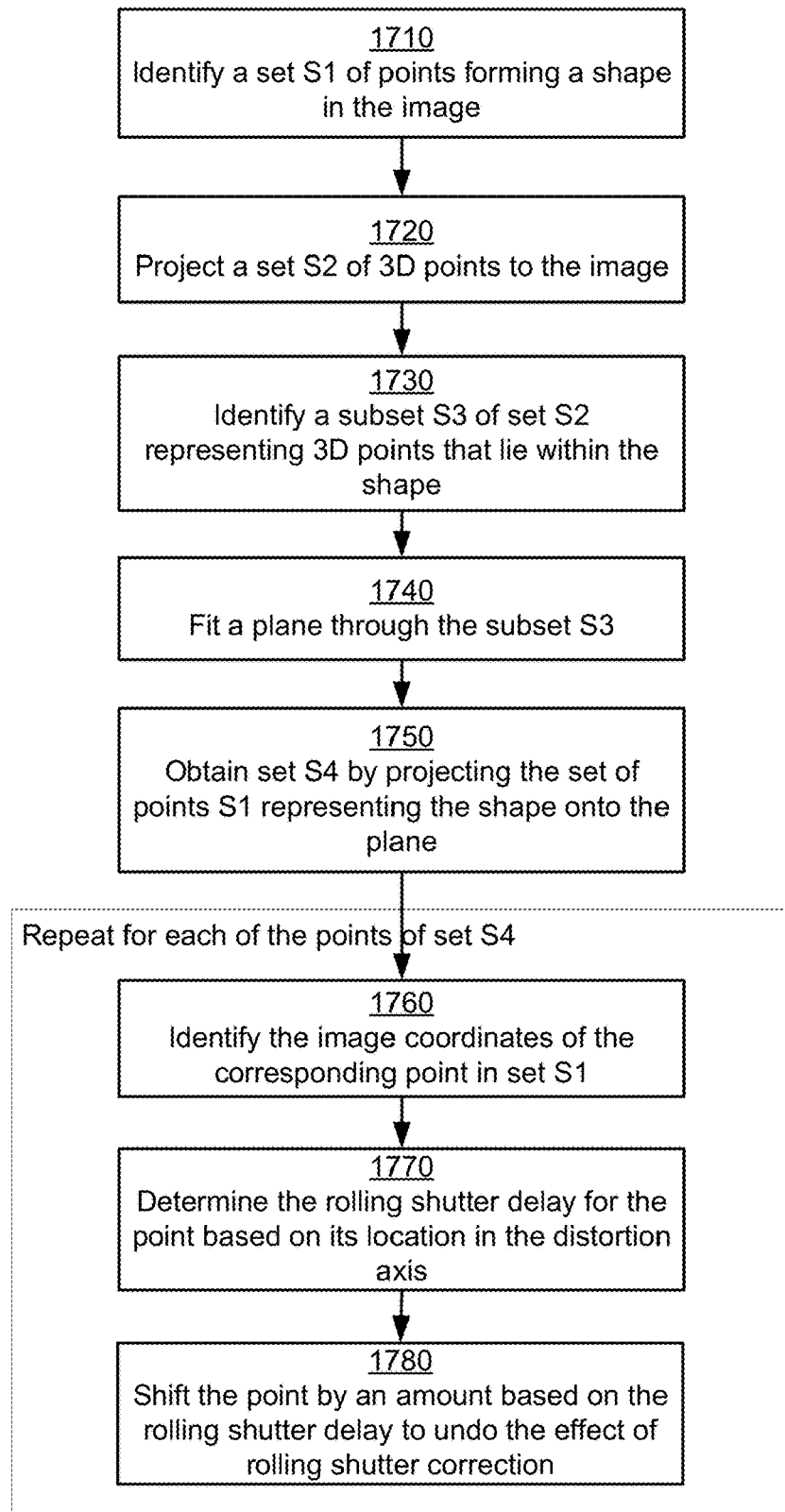
FIG. 17 shows a flowchart illustrating the process of transforming 2D points of image to 3D space, according to an embodiment.

The HD map system may further project shapes of an image to points in the transformed point cloud. This allows the HD map system, for example, to determine where a road sign is present in the transformed point cloud. FIG. 17 shows a flowchart illustrating the process of transforming 2D points of image to 3D space, according to an embodiment. This process is performed after the processing performed as shown in FIG. 16 for correcting for rolling shutter delay. Accordingly, the 3D points have previously been translated along a direction Q. The 3D points may represent lidar data or OMap data.

The rolling shutter correction module 290 identifies a set $\{x\}$ of 2D points in a coordinate system for representing points of the image and aims to find the corresponding 3d coordinates $\{X\}$. The 2D points of the image may be represented using camera coordinate but can be converted to other coordinate systems. A 2D point on the image is also referred to as an image point. The 2D points are referred to as 2D points since they do not have a depth dimension. However, they may store dimensions other than (x, y) coordinates for storing additional information that is distinct from the depth dimension.

The set of 2D points is associated with a shape displayed in the image, for example, a polygon corresponding to a traffic sign, traffic light, a building, a vehicle, and so on. The rolling shutter correction module 290 projects a set of the translated 3D points to the image to identify corresponding image points, for example, points in the camera coordinate system. The rolling shutter correction module 290 selects a subset of translated 3D points from the set of translated 3D points. The selected subset comprises translated 3D points whose projection falls within the shape displayed on the image, for example, all projected points that are within a shape representing a particular traffic sign. The rolling shutter correction module 290 fits a plane through the selected subset of the translated 3D points. For each of a set of 2D points falling within the shape displayed on the image, the rolling shutter correction module 290 projects the 2D point to the fitted plane to determine a depth of the image point.

The rolling shutter correction module 290 translates the projected 2D point in a direction opposite to the direction Q along which the 3D points were translated for rolling shutter correction. The projected 3d coordinates have been corrected for rolling shutter delay, so they are not reflecting the true geometry, but a version that is consistent with image pixels. In order to get the true geometry, the HD map system performs an undo operation that undoes the rolling shutter compensation by moving the 3D points toward the camera if the rolling shutter compensation translated them in a direction Q to a position away from the camera, i.e., moved the point backward in time. For each point in {x}, the HD map system uses their image coordinate to compute the amount of rolling shutter delay {d} for each point, similar to the computation of process illustrated in FIG. 16. Then the HD map system shifts the 3D coordinates of each of these points by X←(d/t) $T^{-1}$* X, to obtain their actual 3D coordinate with rolling shutter compensation undone. This is similar to step 1660 of the 3d-to-2d projection illustrated in FIG. 16, except that car motion T has been inverted, thereby moving the 3D point in a direction opposite of Q.

FIGS. 18A-B show the result of performing rolling shutter correction to the data of FIG. 11, according to an embodiment. As illustrated, the projection of the 3D points corresponding to the pole 1810 match the pixels showing the pole in the image.

Figure 19B:
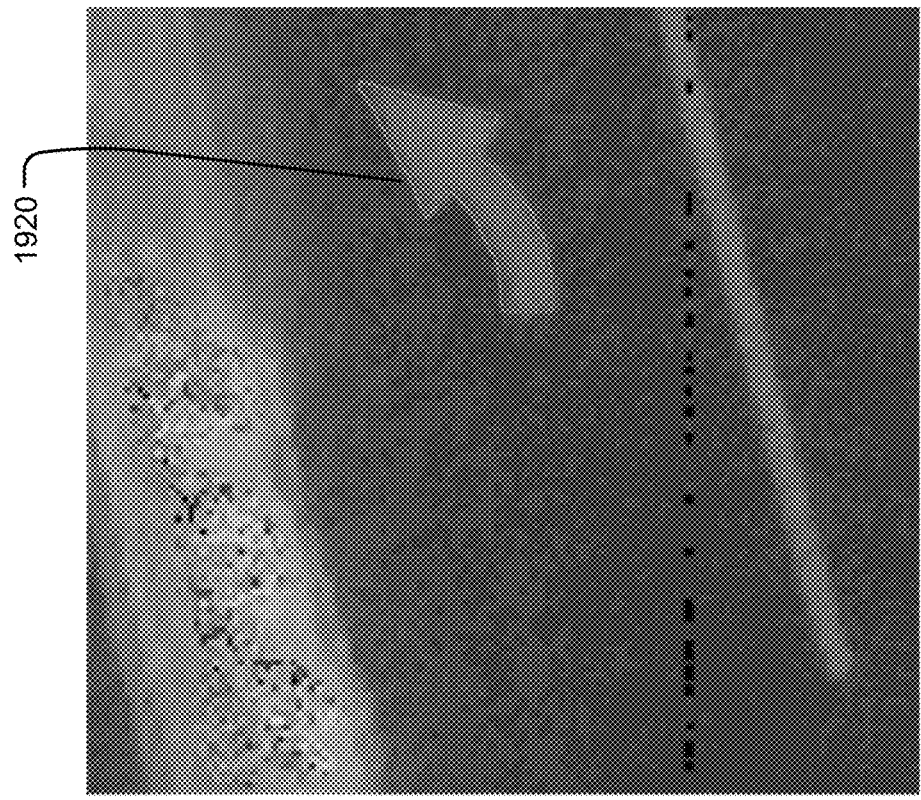
FIGS. 19A-B show the result of performing rolling shutter correction to the data of FIG. 12, according to an embodiment.
Figure 19A:
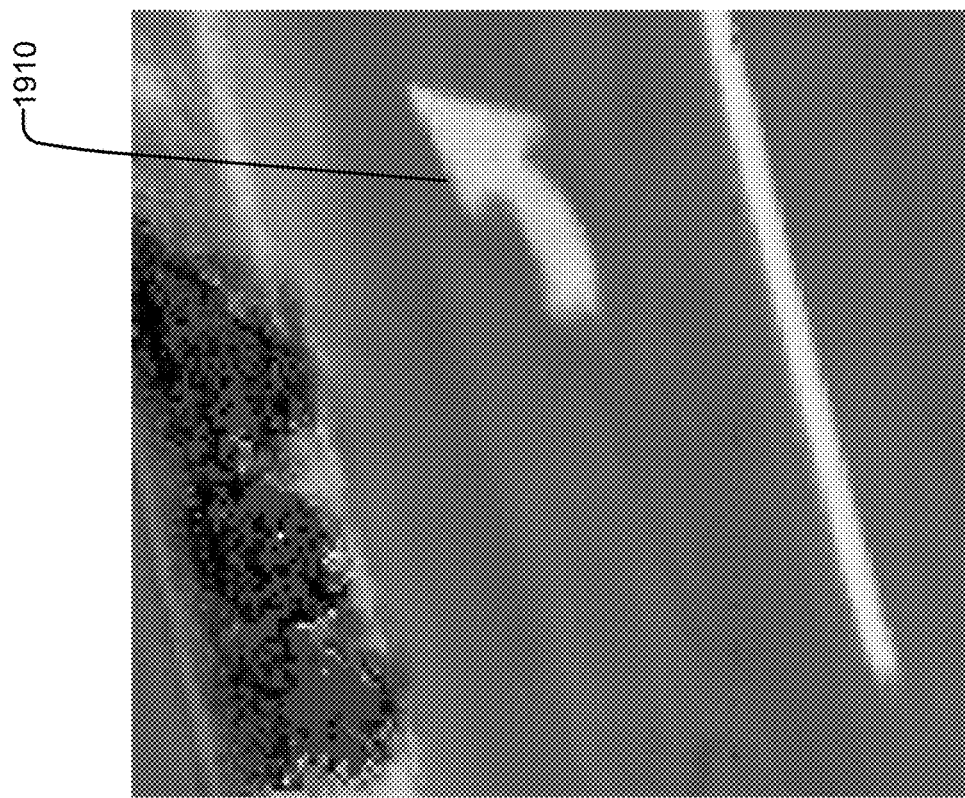

FIGS. 19A-B show the result of performing rolling shutter correction to the data of FIG. 12, according to an embodiment. As illustrated, the projection of the 3D points corresponding to the arrow 1920 match the pixels 1910 showing the pole in the image.

Figure 20B:
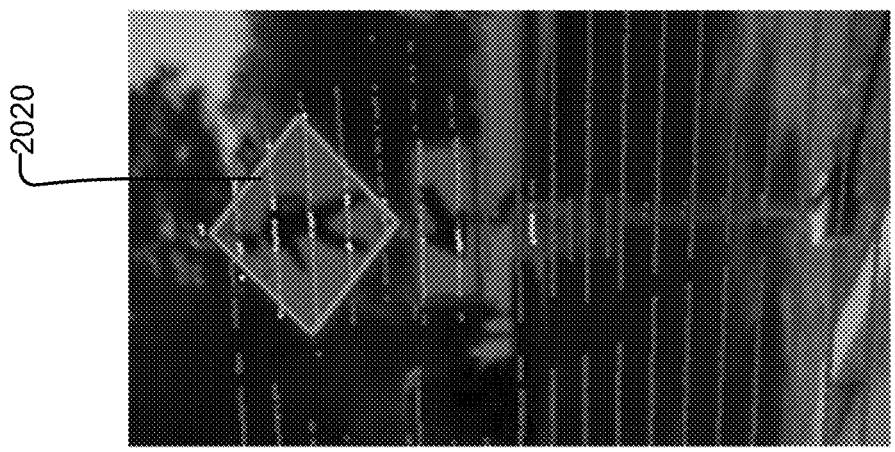
FIGS. 20A-C show the result of performing rolling shutter correction to the data of FIG. 12, according to an embodiment.
Figure 20A:
Figure 20C:
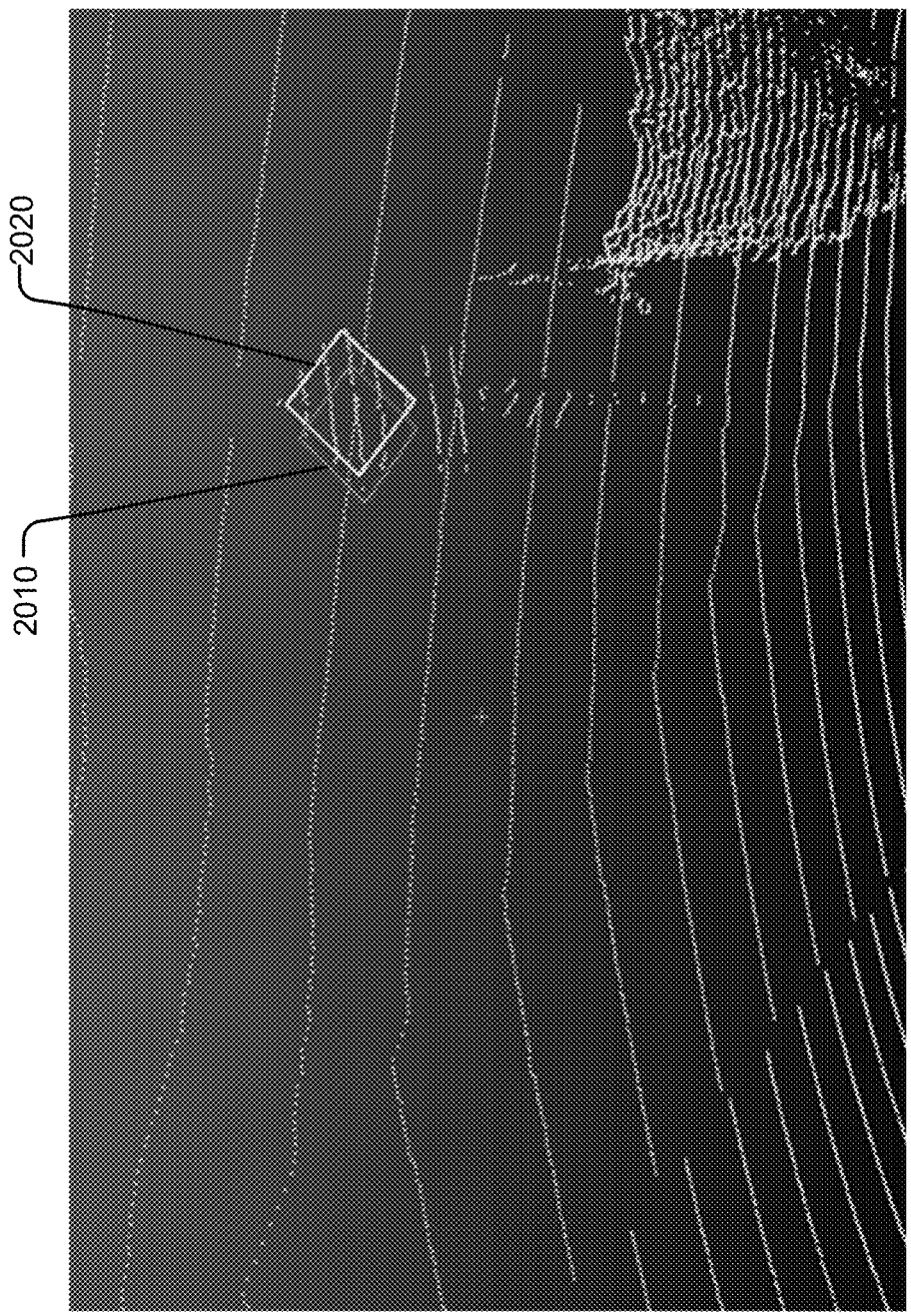

FIGS. 20A-C show the result of performing rolling shutter correction to the data of FIG. 13, according to an embodiment. As illustrated, the projection of the 3D points corresponding to the traffic sign 1310 as shown in FIG. 13 match the pixels showing the traffic sign in the image. The point cloud view in FIG. 20C shows the sign before as shape 2010 and the traffic sign after rolling shutter correction as shape 2020. The traffic sign after rolling correction as illustrated using shape 2020 is aligned with lidar points.

Computing Machine Architecture

Figure 21:
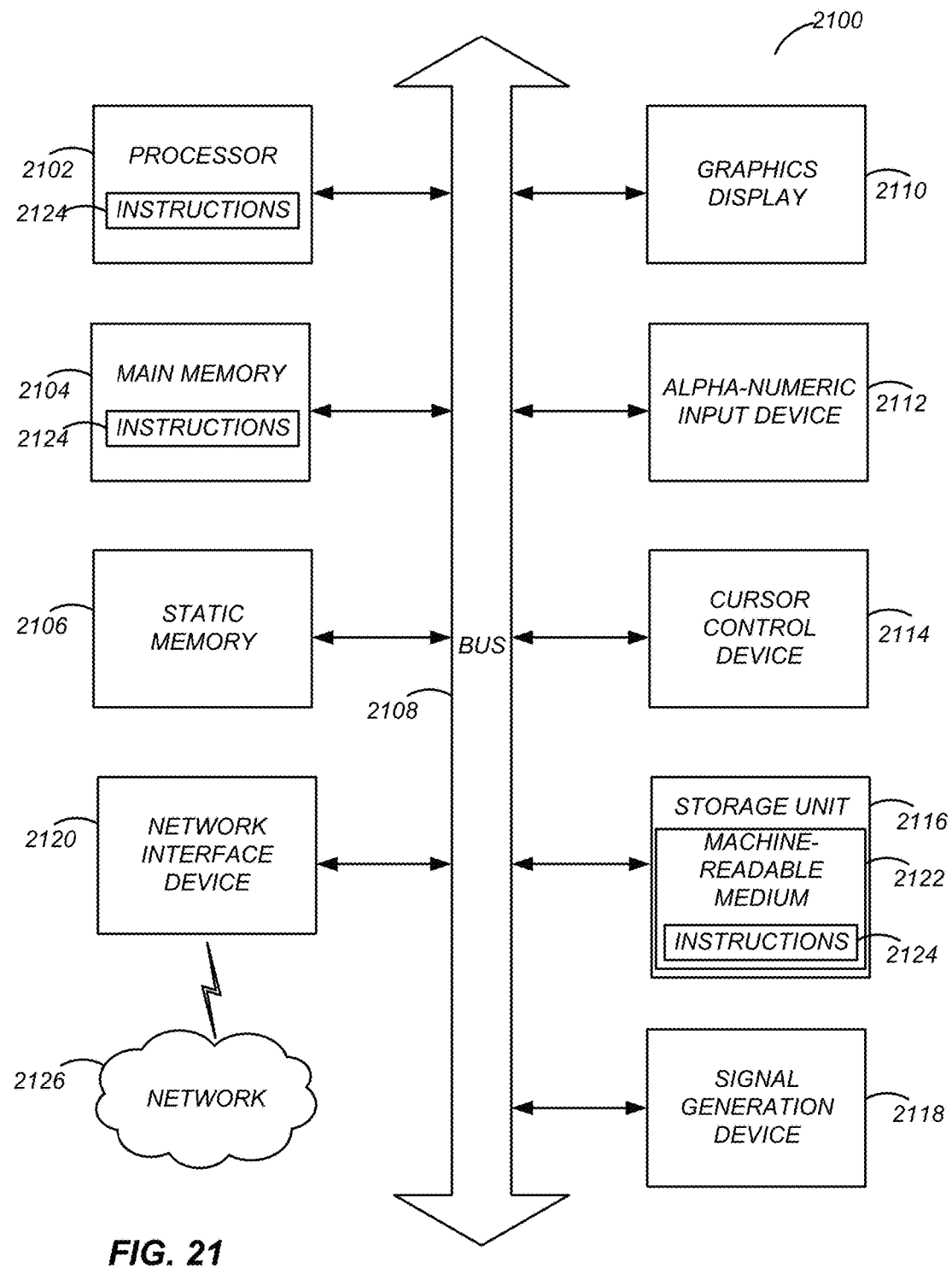
FIG. 21 illustrates an embodiment of a computing machine that can read instructions from a machine-readable medium and execute the instructions in a processor or controller.

FIG. 21 is a block diagram illustrating components of an example machine able to read instructions from a machine-readable medium and execute them in a processor (or controller). Specifically, FIG. 21 shows a diagrammatic representation of a machine in the example form of a computer system 2100 within which instructions 2124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2124 (sequential or otherwise) that specify actions to be taken by that machine. Further, while only a single machine is illustrated, the term "machine" shall also be taken to include any collection of machines that individually or jointly execute instructions 2124 to perform any one or more of the methodologies discussed herein.

The example computer system 2100 includes a processor 2102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2104, and a static memory 2106, which are configured to communicate with each other via a bus 2108. The computer system 2100 may further include graphics display unit 2110 (e.g., a plasma display panel (PDP), a liquid crystal display (LCD), a projector, or a cathode ray tube (CRT)). The computer system 2100 may also include alphanumeric input device 2112 (e.g., a keyboard), a cursor control device 2114 (e.g., a mouse, a trackball, a joystick, a motion sensor, or other pointing instrument), a storage unit 2116, a signal generation device 2118 (e.g., a speaker), and a network interface device 2120, which also are configured to communicate via the bus 2108.

The storage unit 2116 includes a machine-readable medium 2122 on which is stored instructions 2124 (e.g., software) embodying any one or more of the methodologies or functions described herein. The instructions 2124 (e.g., software) may also reside, completely or at least partially, within the main memory 2104 or within the processor 2102 (e.g., within a processor's cache memory) during execution thereof by the computer system 2100, the main memory 2104 and the processor 2102 also constituting machine-readable media. The instructions 2124 (e.g., software) may be transmitted or received over a network 2126 via the network interface device 2120.

While machine-readable medium 2122 is shown in an example embodiment to be a single medium, the term "machine-readable medium" should be taken to include a single medium or multiple media (e.g., a centralized or distributed database, or associated caches and servers) able to store instructions (e.g., instructions 2124). The term "machine-readable medium" shall also be taken to include any medium that is capable of storing instructions (e.g., instructions 2124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A computer implemented method for performing rolling shutter correction of data captured by sensors of a vehicle, comprising:
   receiving an image captured by a rolling shutter camera mounted on a vehicle, the rolling shutter camera capturing the image via an image scan, the image comprising a plurality of scan-lines, the image associated with a distortion axis, wherein each scan-line of the image maps to a distinct point along the distortion axis;
   identifying a plurality of three-dimensional (3D) data points corresponding to the scene captured by the image, each 3D data point having a location in a 3D space;
   for each of the plurality of 3D points:
      projecting the 3D point to the image coordinates to obtain a projected point;
      determining based on the position of the projected point, an estimate of a distance travelled by the vehicle between the time of capture of the 3D point by the rolling shutter camera and the time of completion of the image scan;
      translating the 3D point to location along a direction of movement of the vehicle by the estimate of the distance;
   storing the translated 3D points for displaying in conjunction with the image captured by the rolling shutter camera.

2. The method of claim 1, further comprising:
   project the plurality of translated 3D points on the image to obtain an overlapping image wherein the projection of the 3D points is aligned with the pixels of the image; and
   configuring a user interface for displaying the overlapping image.

3. The method of claim 2, wherein the user interface is displayed by a toolkit for development of a high definition map.

4. The method of claim 3, wherein the vehicle is an autonomous vehicle, further comprising:
   sending signals to the controls of the autonomous vehicle based on the high definition map.

5. The method of claim 1, wherein image is associated with a reference point, wherein determining the estimate of a distance travelled by the vehicle comprises:
   determining a distance of the projected point from the reference point along the distortion axis; and
   determining an estimate of a distance travelled by the vehicle between the time that the 3D point was captured by the rolling shutter camera and the time that the image scan was completed, the estimate of the distance travelled determined based on the distance of the projected point from the reference point along the distortion axis.

6. The method of claim 1, wherein the plurality of 3D points are determined using a lidar scan.

7. The method of claim 1, wherein the plurality of 3D points are determined using sensor data captured by one or more vehicles previously travelling along the path of the moving vehicle.

8. The method of claim 1, further comprising, mapping a shape displayed in the image to 3D space, comprising:
   projecting a set of the translated 3D points to the image;
   selecting a subset of the set of translated 3D points, the subset comprising translated 3D points whose projection falls within the shape displayed in the image;
   fitting a plane through the selected subset of translated 3D points; and
   determining a depth of a 2D point within the shape displayed in the image by projecting the 2D point to the fitted plane.

9. A non-transitory computer readable storage medium storing instructions for performing rolling shutter correction of data captured by sensors of a vehicle, wherein the instructions when executed by a processor, cause the processor to perform the steps comprising:
   receiving an image captured by a rolling shutter camera mounted on a vehicle, the rolling shutter camera capturing the image via an image scan, the image comprising a plurality of scan-lines, the image associated with a distortion axis, wherein each scan-line of the image maps to a distinct point along the distortion axis;
   identifying a plurality of three-dimensional (3D) data points corresponding to the scene captured by the image, each 3D data point having a location in a 3D space;
   for each of the plurality of 3D points:
      projecting the 3D point to the image coordinates to obtain a projected point;
      determining based on the position of the projected point, an estimate of a distance travelled by the vehicle between the time of capture of the 3D point by the rolling shutter camera and the time of completion of the image scan;

translating the 3D point to location along a direction of movement of the vehicle by the estimate of the distance;

storing the translated 3D points for displaying in conjunction with the image captured by the rolling shutter camera.

10. The non-transitory computer readable medium of claim 9, wherein the stored instructions further cause the processor to perform the steps comprising:

projecting the plurality of translated 3D points on the image to obtain an overlapping image wherein the projection of the 3D points is aligned with the pixels of the image; and configuring a user interface for displaying the overlapping image.

11. The non-transitory computer readable medium of claim 10, wherein the user interface is displayed by a toolkit for development of a high definition map.

12. The non-transitory computer readable medium of claim 11, wherein the vehicle is an autonomous vehicle, wherein the stored instructions further cause the processor to perform the steps comprising:

sending signals to the controls of the autonomous vehicle based on the high definition map.

13. The non-transitory computer readable medium of claim 9, wherein image is associated with a reference point, wherein instructions for determining the estimate of a distance travelled by the vehicle comprise instructions:

determining a distance of the projected point from the reference point along the distortion axis; and determining an estimate of a distance travelled by the vehicle between the time that the 3D point was captured by the rolling shutter camera and the time that the image scan was completed, the estimate of the distance travelled determined based on the distance of the projected point from the reference point along the distortion axis.

14. The non-transitory computer readable medium of claim 9, wherein the plurality of 3D points are determined using a lidar scan.

15. The non-transitory computer readable medium of claim 9, wherein the plurality of 3D points are determined using sensor data captured by one or more vehicles previously travelling along the path of the moving vehicle.

16. The non-transitory computer readable medium of claim 9, wherein the stored instructions further cause the processor to map a shape displayed in the image to 3D space by performing the steps of:

projecting a set of the translated 3D points to the image;

selecting a subset of the set of translated 3D points, the subset comprising translated 3D points whose projection falls within the shape displayed in the image;

fitting a plane through the selected subset of translated 3D points; and determining a depth of a 2D point within the shape displayed in the image by projecting the 2D point to the fitted plane.

17. A computer system comprising:

a processor; and a non-transitory computer readable storage medium storing instructions for performing rolling shutter correction of data captured by sensors of a vehicle, wherein the instructions when executed by a processor, cause the processor to perform the steps comprising:

receiving an image captured by a rolling shutter camera mounted on a vehicle, the rolling shutter camera capturing the image via an image scan, the image comprising a plurality of scan-lines, the image associated with a distortion axis, wherein each scan-line of the image maps to a distinct point along the distortion axis;

identifying a plurality of three-dimensional (3D) data points corresponding to the scene captured by the image, each 3D data point having a location in a 3D space;

for each of the plurality of 3D points:

projecting the 3D point to the image coordinates to obtain a projected point;

determining based on the position of the projected point, an estimate of a distance travelled by the vehicle between the time of capture of the 3D point by the rolling shutter camera and the time of completion of the image scan;

translating the 3D point to location along a direction of movement of the vehicle by the estimate of the distance;

storing the translated 3D points for displaying in conjunction with the image captured by the rolling shutter camera.

18. The computer system of claim 17, wherein the stored instructions further cause the processor to perform the steps comprising:

projecting the plurality of translated 3D points on the image to obtain an overlapping image wherein the projection of the 3D points is aligned with the pixels of the image; and configuring a user interface for displaying the overlapping image.

19. The computer system of claim 17, wherein image is associated with a reference point, wherein instructions for determining the estimate of a distance travelled by the vehicle comprise instructions:

determining a distance of the projected point from the reference point along the distortion axis; and determining an estimate of a distance travelled by the vehicle between the time that the 3D point was captured by the rolling shutter camera and the time that the image scan was completed, the estimate of the distance travelled determined based on the distance of the projected point from the reference point along the distortion axis.

20. The computer system of claim 17, wherein the stored instructions further cause the processor to map a shape displayed in the image to 3D space by performing the steps of:

projecting a set of the translated 3D points to the image;

selecting a subset of the set of translated 3D points, the subset comprising translated 3D points whose projection falls within the shape displayed in the image;

fitting a plane through the selected subset of translated 3D points; and determining a depth of a 2D point within the shape displayed in the image by projecting the 2D point to the fitted plane.

* * * * *